United States Patent
Wang et al.

(10) Patent No.: US 11,297,652 B2
(45) Date of Patent: Apr. 5, 2022

(54) WIRELESS DEVICE, NETWORK NODE AND METHODS PERFORMED THEREBY FOR HANDLING ACCESS TO A CELL

(71) Applicant: Telefonaktiebolaget LM Ericsson (publ), Stockholm (SE)

(72) Inventors: Min Wang, Luleå (SE); Jan Christoffersson, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 168 days.

(21) Appl. No.: 16/480,936

(22) PCT Filed: Jun. 14, 2019

(86) PCT No.: PCT/SE2019/050560
§ 371 (c)(1),
(2) Date: Jul. 25, 2019

(87) PCT Pub. No.: WO2019/245430
PCT Pub. Date: Dec. 26, 2019

(65) Prior Publication Data
US 2021/0153253 A1     May 20, 2021

Related U.S. Application Data

(60) Provisional application No. 62/687,816, filed on Jun. 21, 2018.

(51) Int. Cl.
*H04W 74/08* (2009.01)
*H04W 72/02* (2009.01)
*H04W 72/04* (2009.01)

(52) U.S. Cl.
CPC ....... *H04W 74/0833* (2013.01); *H04W 72/02* (2013.01); *H04W 72/0453* (2013.01)

(58) Field of Classification Search
None
See application file for complete search history.

(56) References Cited

U.S. PATENT DOCUMENTS

2011/0103328 A1   5/2011   Lee et al.
2019/0222367 A1*   7/2019   Tseng ..................... H04L 5/001

OTHER PUBLICATIONS

Huawei, Discussion on the PRACH for SUL (Year: 2017).*
Unknown, Author, "CA and BWP", 3GPP TSG RAN WG1 NR AdHoc#3, R1-1716440, Nagoya, Japan, Sep. 18-21, pp. 1-7.

(Continued)

*Primary Examiner* — Ayanah S George
(74) *Attorney, Agent, or Firm* — Sage Patent Group

(57) ABSTRACT

A method, performed by a wireless device (130), for handling access to a cell (120). The wireless device (130) operates in a wireless communications network (100). The wireless device (130) determines (302), given a first uplink carrier (141) in use during a random access procedure to the cell (120), whether or not a second uplink carrier (142) is to be used during the random access procedure to the cell (120), instead of the first uplink carrier (141). The cell (120) is served by a network node (110) operating in the wireless communications network (100). The wireless device (130) then uses (305), based on a result of the determination, one of the first uplink carrier (141) and the second uplink carrier (142), to continue the random access procedure to the cell (120).

24 Claims, 10 Drawing Sheets

(56) References Cited

OTHER PUBLICATIONS

Unknown, Author, "Discussion on the PRACH for SUL", 3GPP TSG RAN WG1 Meeting NR#3, R1-1715716, Nagoya, Japan, Sep. 18-21, 2017, pp. 1-5.
Unknown, Author, "PDCCH order on both SUL and NUL", 3GPP TSG-RAN WG2 Meeting #102, R2-1808554, Busan, Republic of Korea, May 21-25, 2018, pp. 1-2.
Unknown, Author, "Random Access Fallback to SUL", 3GPP TSG-RAN WG2 NR AH#3, Tdoc R2-1800686, Vancouver, Canada, Jan. 22-26, 2018, pp. 1-2.
Unknown, Author, "Remaining Details for Physical Random Access Channel", 3GPP TSG RAN WG1 Meeting 92, R1-1804842, Sanya, China, Apr. 16-20, 2018, pp. 1-5.
Unknown, Author, "SUL Operation in NR Standalone", 3GPP TSG-RAN WG2 Meeting #101, R2-1802827, Athens, Greece, Feb. 26-Mar. 2, 2018, pp. 1-4.
Unknown, Author, "3rd Generation Partnership Project; Technical Specification Group Radio Access Network NR; Medium Access Control (MAC) protocol specification (Release 15)", 3GPP TS 38.321 V15.2.0, Jun. 2018, pp. 1-73.

\* cited by examiner

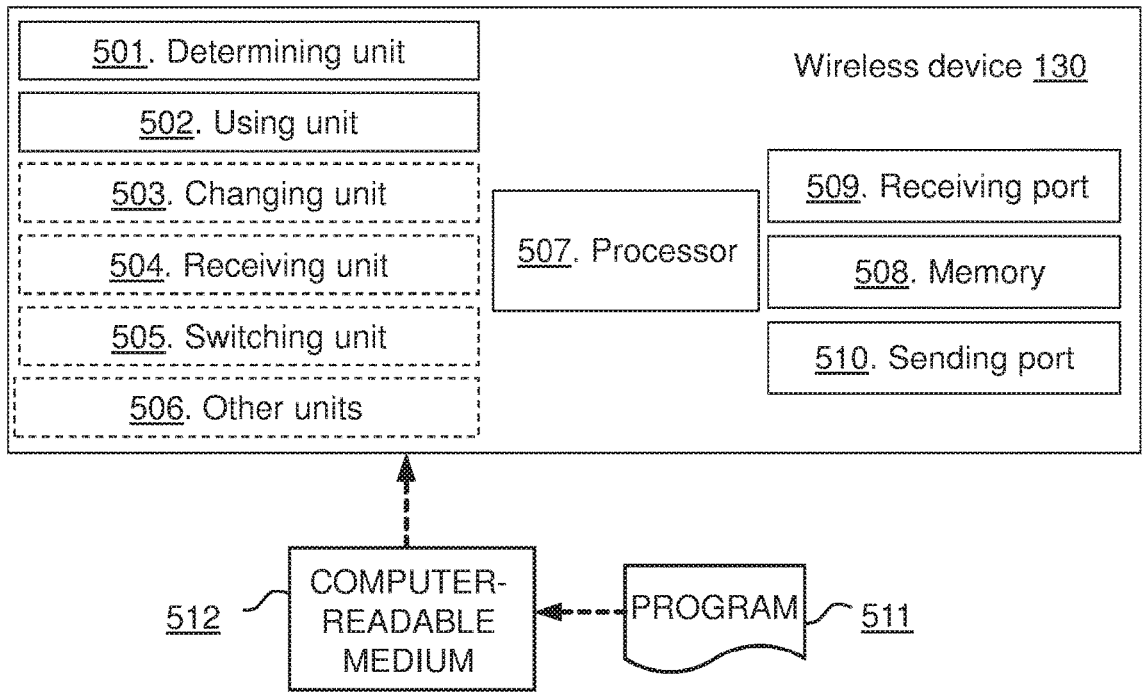
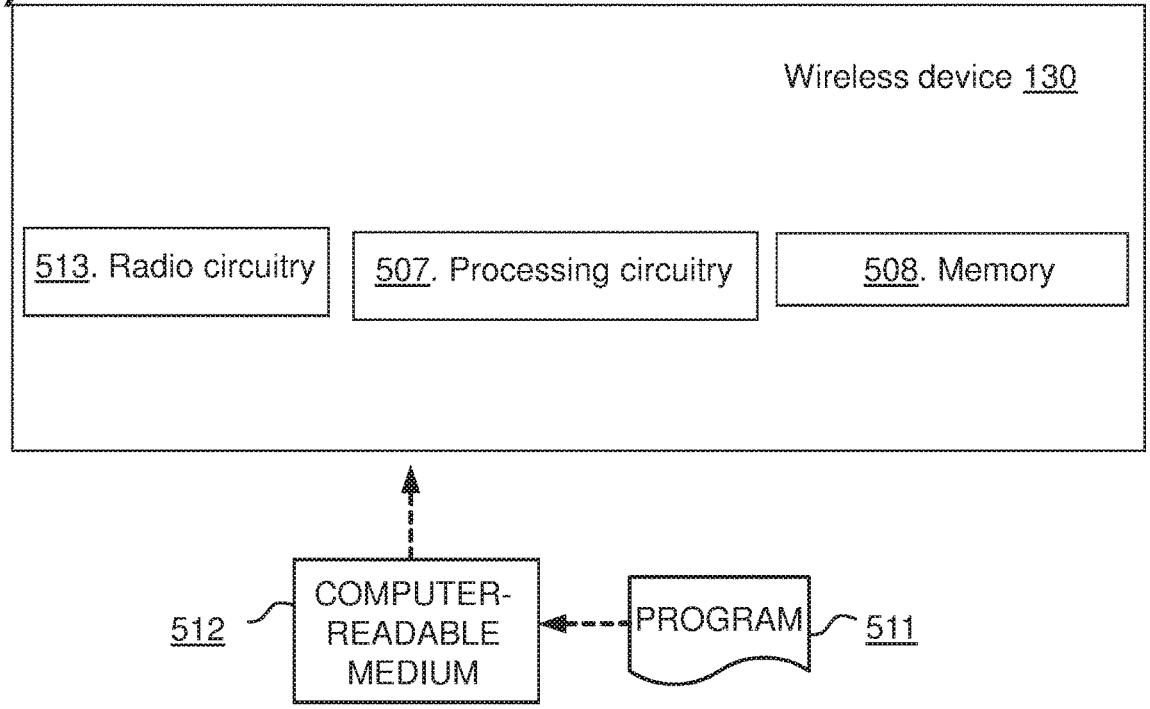
Figure 5 a)
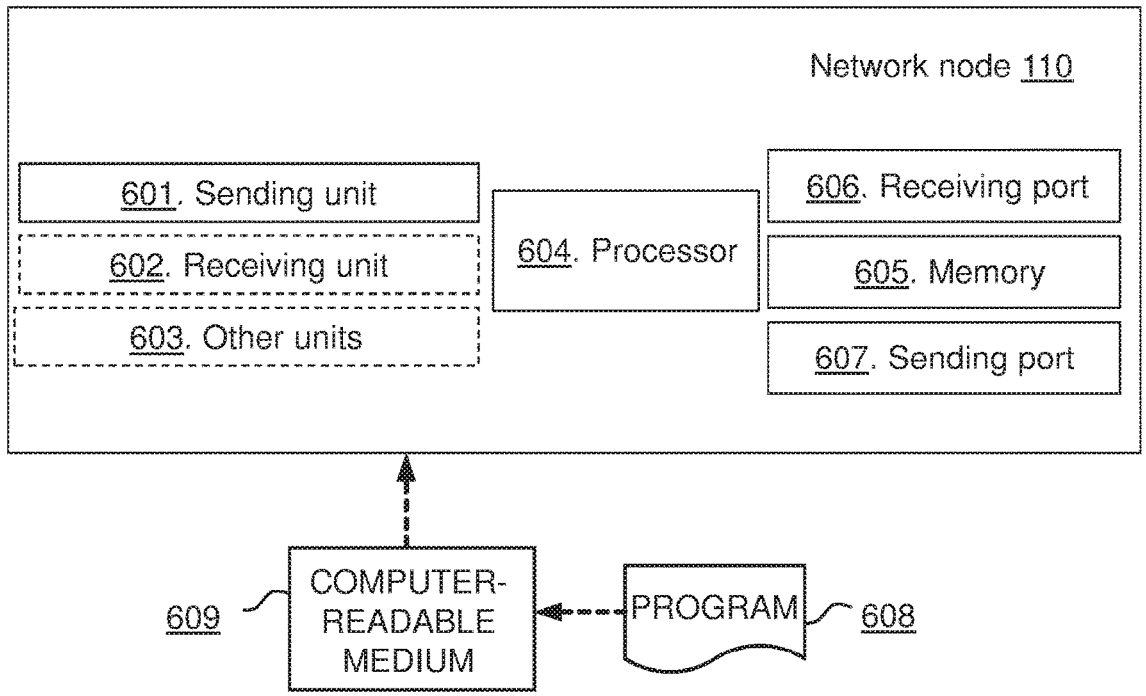
b)
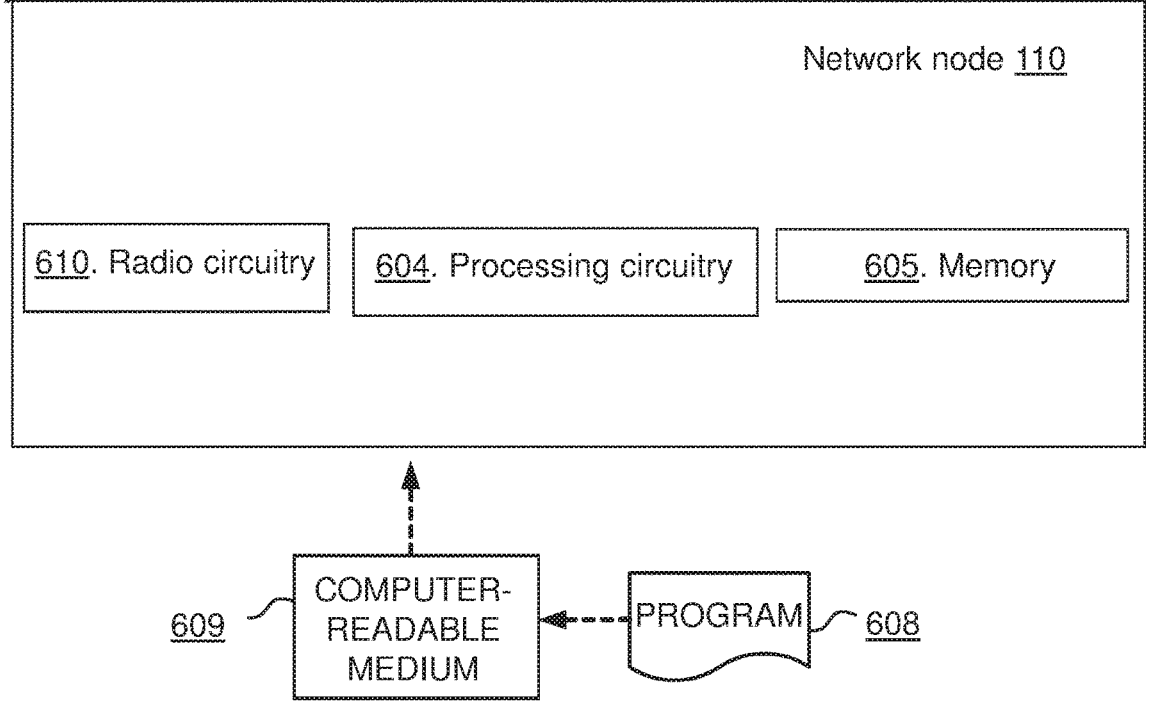
Figure 6

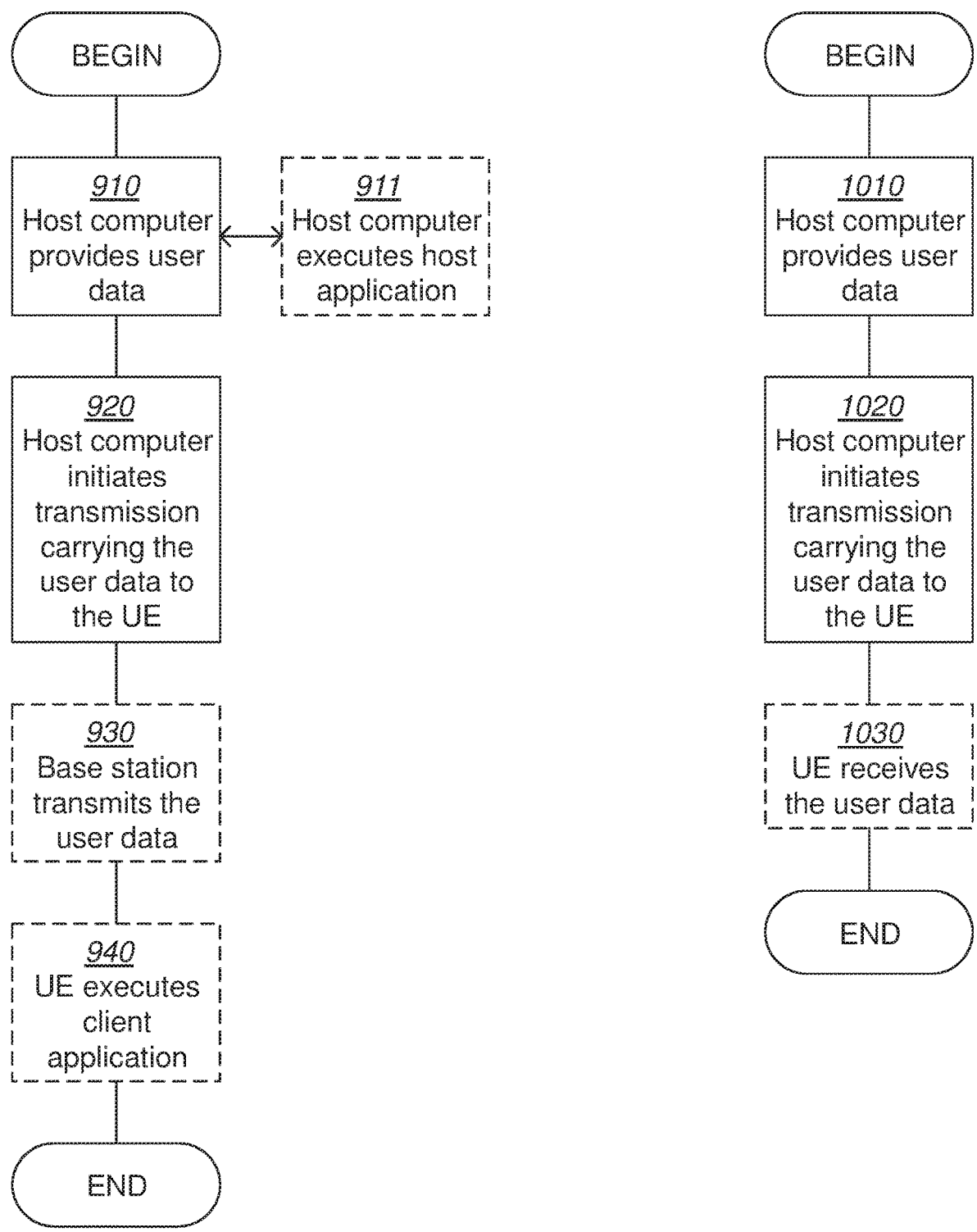

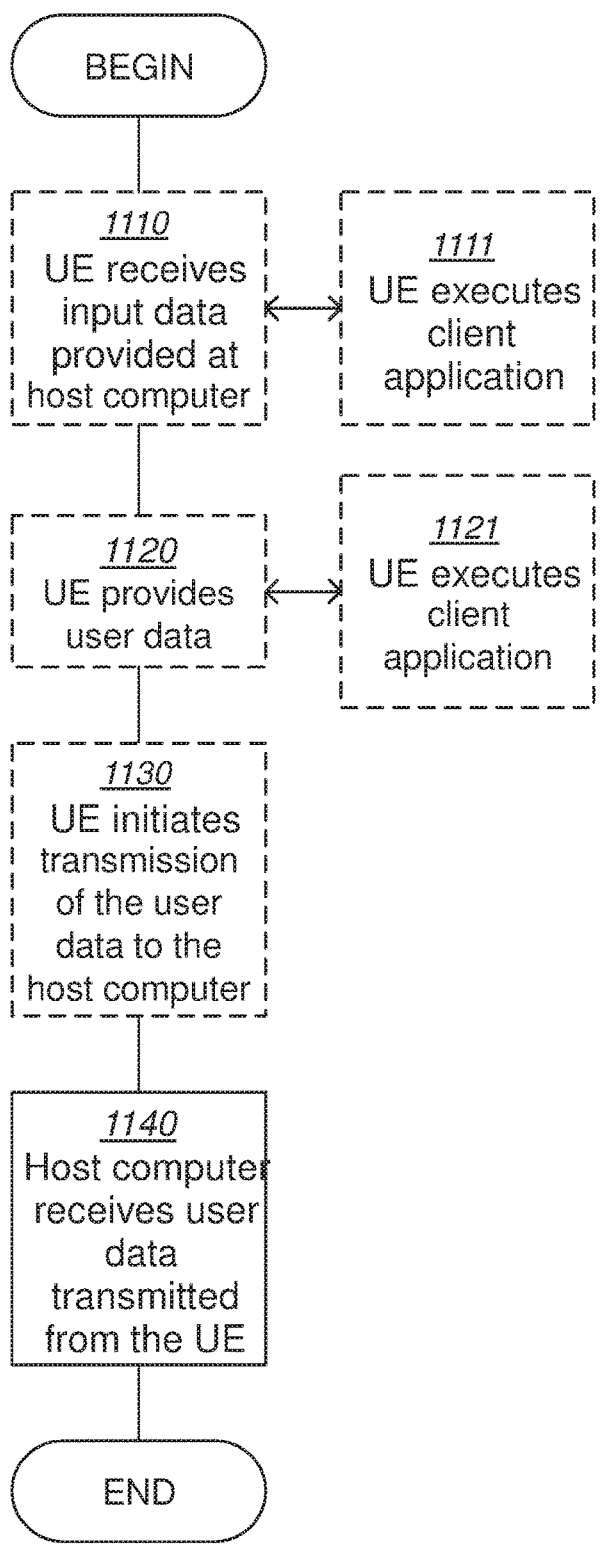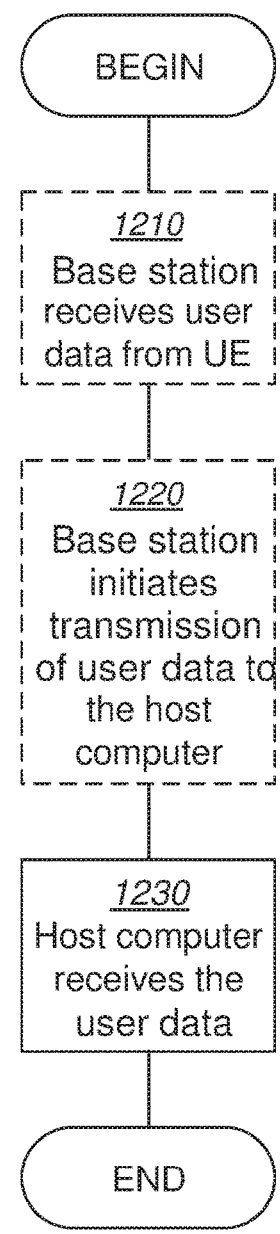
FIG. 11
FIG. 12

WIRELESS DEVICE, NETWORK NODE AND METHODS PERFORMED THEREBY FOR HANDLING ACCESS TO A CELL

TECHNICAL FIELD

The present disclosure relates generally to a wireless device, and methods performed thereby, for handling access to a cell. The present disclosure also relates generally to a network node, and methods performed thereby, for handling access by the wireless device to a cell.

BACKGROUND

Communication devices within a wireless communications network may be wireless devices such as e.g., User Equipments (UEs), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone, and/or between a wireless device and a server via a Radio Access Network (RAN), and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

A wireless communication network may also comprise network nodes, such as radio network nodes, e.g., Transmission Points (TP). The wireless communications network covers a geographical area which may be divided into cell areas, each cell area being served by a network node such as a Base Station (BS), e.g. a Radio Base Station (RBS), which sometimes may be referred to as e.g., gNB, evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

NR

The so-called 5G system, from a radio perspective started to be standardized in 3GPP, and the so-called New Radio (NR) is the name for the radio interface. NR architecture is being discussed in 3GPP. In the current concept, gNB denotes NR BS, where one NR BS may correspond to one or more transmission/reception points. As the low carrier frequency bands were already deployed with 2G, 3G and 4G wireless communication systems, NR will be deployed at relatively higher frequencies than LTE, e.g., above 6 GHz, where it is known to have more challenging propagation conditions such as a higher penetration loss. For wireless communication, the propagation loss may be roughly proportional to the square of the carrier frequency. Hence, there may be coverage issues for wireless communication over high carrier frequencies. For downlink, the gNB may be equipped with powerful antenna systems and powerful amplifiers to boost the transmission power density, hence the DL coverage may be boosted. However, for UL, there may be several restrictions such as transmit power, antenna size and cost. Hence, there may be a mismatch between UL and DL for a NR cell at high frequency.

For solving this, NR introduced a Supplementary UpLink (SUL) carrier for an NR cell, that is, an NR cell may have a SUL carrier plus an NR UL carrier. The SUL carrier may be understood to be a low frequency carrier which may be shared, in time and/or frequency domain, with another Radio Access Technology (RAT) system such as LTE. FIG. 1 is a schematic diagram showing an example of the coverages of the NR UL carrier 10, the SUL carrier 20, and an NR DL carrier 30 in an NR cell 40 served by a gNB 50.

Since there are two uplink carriers for a NR cell in this case, the random access may be initiated in either the NR UL carrier 10 or the SUL carrier 20. It was agreed that a UE may select which carrier to use for random access, based on a threshold. If the UE determines it is close to the gNB 40 based on the threshold, a UE may be required to select the NR UL carrier 10 for random access due to the fact that the radio condition is good enough to finish the random access procedure over NR UL carrier 10. Otherwise, the UE may be required to select the SUL carrier 20 to finish the random access procedure. In such way, the random access load may be offloaded between two UL carriers in a NR cell, such as the NR cell 40.

Some agreements concerning the Random Access CHannel (RACH) access for SUL carriers have been made at RAN1 #90, and highlighted as below.

For NR UE initial access based on RACH configuration for an SUL carrier
  RACH configuration for the SUL carrier is broadcasted in Remaining Minimum System Information (RMSI)
  The configuration information for the SUL carrier is sufficient for UEs to complete RACH procedure via only that SUL carrier
    In particular the configuration information includes all necessary power control parameters
  The configuration information for the SUL carrier includes a threshold. The UE selects that SUL carrier for initial access if and only if the Reference Signal Received Power (RSRP) measured by the UE on the DL carrier where the UE receives RMSI is lower than the threshold
  If the UE starts its RACH procedure on the SUL carrier, then the RACH procedure is completed with all uplink transmission taking place on that carrier It is expected that the network would be able to request a connected-mode UE to initiate a RACH procedure towards any uplink carrier for path-loss and timing-advance acquisition The above agreements have been captured by the Medium Access Control (MAC) specification, and highlighted as below.

In the Random Access procedure, the selection of SUL or NUL (NR UL carrier) is done according to the following in 38.321, Section 5.1.1, v. 15.2.0, Random Access procedure initialization, wherein PCMAX corresponds to the configured maximum output power of a UE:

1> if the Serving Cell for the Random Access procedure is configured with supplementaryUplink; and
1> if the RSRP of the downlink pathloss reference is less than rsrp-ThresholdSSB-SUL:
   2> select the SUL carrier for performing Random Access procedure;
   2> set the PCMAX to $P_{CMAX,f,c}$ of the SUL carrier.
1> else:
   2> select the NUL carrier for performing Random Access procedure;
   2> set the PCMAX to $P_{CMAX,f,c}$ of the NUL carrier.
1> perform the Random Access Resource selection procedure (see subclause 5.1.2).

According to the foregoing and for the reasons that will be explained later, existing methods for handling cell access may result in UEs failing to access the cell, and/or to experience high latencies, which may lead to wasted radio, processing and energy resources, and thereby decreased capacity and/or increased latency in the network.

SUMMARY

It is an object of embodiments herein to improve the handling of cell access in a wireless communications network.

According to a first aspect of embodiments herein, the object is achieved by a method performed by a wireless device. The method is for handling access to a cell. The wireless device operates in a wireless communications network. The wireless device determines, given a first uplink carrier in use during a random access procedure to the cell, whether or not a second uplink carrier is to be used during the random access procedure to the cell, instead of the first uplink carrier. The cell is served by a network node operating in the wireless communications network. The wireless device also uses, based on a result of the determination, one of the first uplink carrier and the second uplink carrier, to continue the random access procedure to the cell.

According to a second aspect of embodiments herein, the object is achieved by a method performed by the network node. The method is for handling access to the cell. The cell is served by the network node. The network node and the wireless device operate in the wireless communications network. The network node sends the indication to the wireless device indicating whether or not a change between the first uplink carrier and the second uplink carrier is allowed during the random access procedure to the cell. The network node then receives, given the first uplink carrier in use during the random access procedure to the cell with the wireless device, signalling for the random access procedure to the cell using the second uplink carrier, instead of the first uplink carrier. The receiving is based on the sent indication.

According to a third aspect of embodiments herein, the object is achieved by the wireless device. The wireless device may be considered to be for handling access to the cell. The wireless device is configured to operate in the wireless communications network. The first wireless device is further configured to determine, given the first uplink carrier configured to be in use during the random access procedure to the cell configured to be served by the network node configured to operate in the wireless communications network, whether or not the second uplink carrier is to be used during the random access procedure to the cell, instead of the first uplink carrier. The wireless device is also configured to use, based on the result of the determination, one of the first uplink carrier and the second uplink carrier, to continue the random access procedure to the cell.

According to a fourth aspect of embodiments herein, the object is achieved by the network node. The network node may be considered to be for handling access by the wireless device to the cell. The cell is configured to be served by the network node. The network node and the wireless device are configured to operate in the wireless communications network. The network node is further configured to send the indication to the wireless device indicating whether or not a change between the first uplink carrier and the second uplink carrier is allowed during the random access procedure to the cell. The network node is also configured to receive, given the first uplink carrier configured to be in use during the random access procedure to the cell with the wireless device, signalling for the random access procedure to the cell using the second uplink carrier, instead of the first uplink carrier. The receiving is configured to be based on the sent indication.

By the wireless device determining whether or not to use the second uplink carrier during the random access procedure, and then using one of the uplink carriers based on the determination, the wireless device is enabled to change UL carrier, e.g., from SUL to NUL, or vice versa, during an ongoing random access procedure, based on one or more criteria. This allows the wireless device to optimize the random access procedure by for example, obtaining better coverage, e.g., in case of pathloss variation, with shorter delay, e.g., in cases where the wireless device may choose the uplink carrier with lower load. This ability to determine or not whether to change uplink carrier, may in turn allow the success ratio for the random access procedure to be improved, decreasing the probability of failures, and decreasing the random access delay.

BRIEF DESCRIPTION OF THE DRAWINGS

Examples of embodiments herein are described in more detail with reference to the accompanying drawings, and according to the following description.

FIG. 5 is a schematic block diagram illustrating two non-limiting examples, a) and b), of a wireless device, according to embodiments herein.

FIG. 6 is a schematic block diagram illustrating two non-limiting examples, a) and b), of a network node, according to embodiments herein.

FIG. 9 is a flowchart depicting embodiments of a method in a communications system including a host computer, a base station and a user equipment, according to embodiments herein.

FIG. 10 is a flowchart depicting embodiments of a method in a communications system including a host computer, a base station and a user equipment, according to embodiments herein.

FIG. 11 is a flowchart depicting embodiments of a method in a communications system including a host computer, a base station and a user equipment, according to embodiments herein.

FIG. 12 is a flowchart depicting embodiments of a method in a communications system including a host computer, a base station and a user equipment, according to embodiments herein.

DETAILED DESCRIPTION

Figure 1:
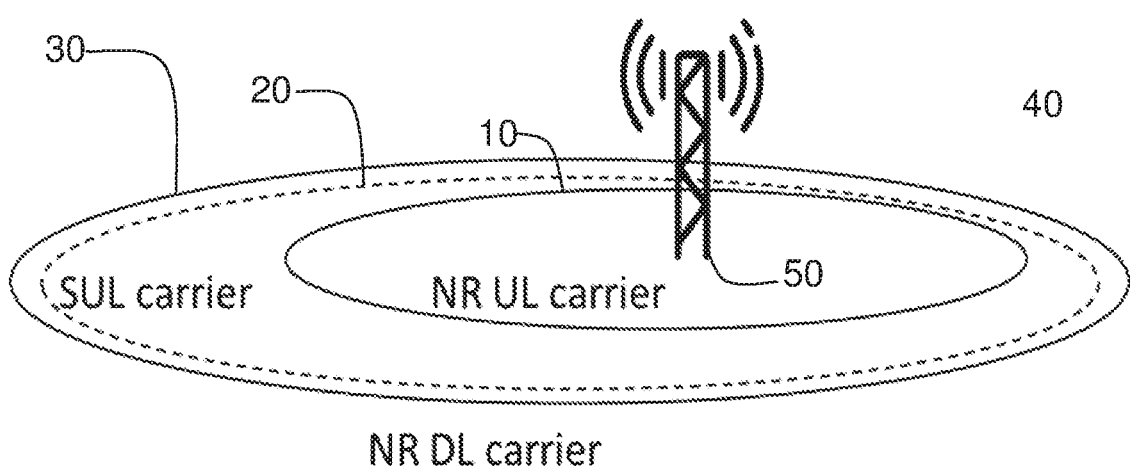
FIG. 1 is a schematic diagram illustrating an NR frequency combination of a paired carrier and a SUL, for UL only.

As part of the development of embodiments herein, one or more problems with the existing technology will first be identified and discussed.

In NR, it was agreed that an idle UE may select a SUL carrier to perform initial access according a measured DL RSRP in a region where RMSI may be being transmitted, compared to a preconfigured threshold. It was also agreed that as soon as the UE selects the SUL carrier for initial RACH access, the UE shall stay at the same carrier until the complete RACH access procedure is completed. In other words, it is not allowed for the UE to switch between the SUL and the non-SUL carrier within a RACH access procedure. This principle may be considered simple, however, it may lead to a risk of more RACH failures. Especially when the UE moves around, the pathloss of the UE may experience a sudden variation during the RACH procedure, which may take up to seconds to finish when the system is highly loaded with RACH accesses. In this case, the UE would choose either of both carriers for RACH access depending on the measured DL RSRP, however, that selected carrier may not be suitable any more after a couple of times of RACH transmission attempts.

The selection of UL carrier during a Random Access procedure initialization means that in cases where the UE fails to receive a Random Access Response (RAR), receives a RAR with Back off, or fails Contention Resolution, it will remain on the same carrier, SUL or NUL that was initially selected when doing the next Physical Random Access CHannel (PRACH) preamble transmission. In cases where the initially selected carrier suffers from high load, or the UE experiences bad coverage, this is not an optimal solution. Since the Random Access procedure may be ongoing for a considerable time, e.g., when the UE backs off several times or fails contention resolution several times, it may be expected that also the coverage situation may change during an ongoing Random Access procedure.

Certain aspects of the present disclosure and their embodiments may provide solutions to this challenge or other challenges. There are, proposed herein, various embodiments which address one or more of the issues disclosed herein.

Having the ability to change carrier for a new PRACH Preamble Transmission may be advantageous in at least two cases: the first is when the coverage on the NUL carrier has degraded and a reselection from NUL to the SUL may enhance the coverage. This would enable these UEs to obtain coverage and a possibility of successful completion of the Random Access procedure. The second case is when the load on the SUL carrier is high. In this case, some of the SUL UEs may have come into NUL coverage and may reselect to the less loaded NUL carrier. Also in this case, this may enable these UEs with a possibility of successful completion of the Random Access procedure.

Accordingly, embodiments herein may be understood to address the problem in existing methods discussed above by providing enhancements to the carrier switch for the RACH access procedure. With the methods described herein, the UE may be allowed to change UL carrier from SUL to NUL, or vice versa, during an ongoing RA procedure. In the different embodiments, the SUL/NUL selection criteria may be evaluated before the UE does a new preamble transmission. The evaluation may be done based on, for example, a number of preamble transmissions or be timer based.

Embodiments herein may be understood to be related to a method to switch RACH between a SUL and a non-SUL carrier.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from LTE/5G has been used in this disclosure to exemplify the embodiments herein, this should not be seen as limiting the scope of the embodiments herein to only the aforementioned system. Other wireless systems with similar features, may also benefit from exploiting the ideas covered within this disclosure.

Figure 2:
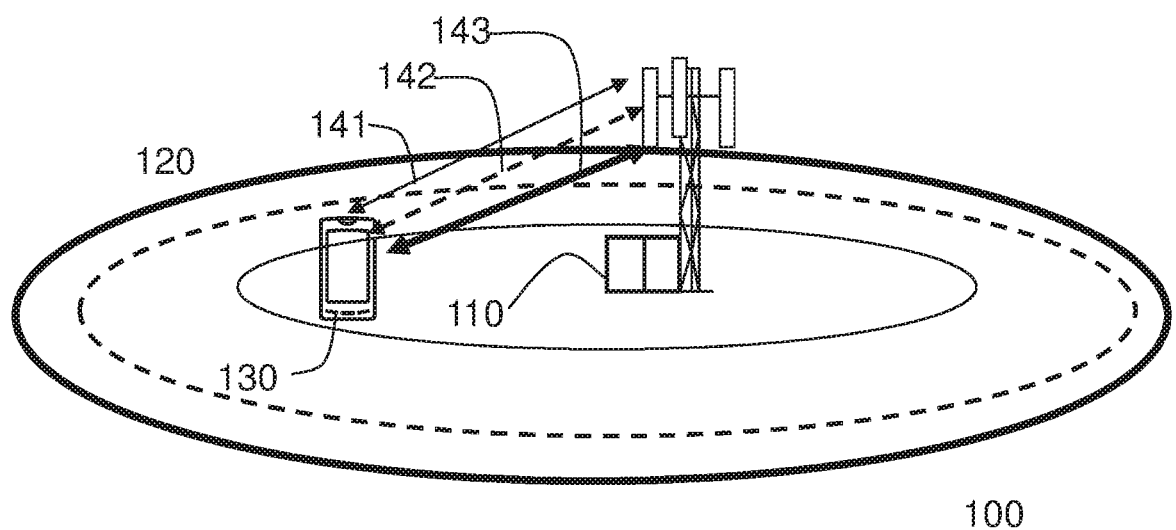
FIG. 2 is a schematic diagram illustrating a wireless communications network, according to embodiments herein.

FIG. 2 depicts a non-limiting example of a wireless communications network 100, sometimes also referred to as a wireless communications system, cellular radio system, or cellular network, in which embodiments herein may be implemented. The wireless communications network 100 may typically be a 5G system, 5G network, NR-U or Next Gen System or network. In some examples, the wireless communications network 100 may be an LTE network connected to a core network of a 5G network (5GC). The wireless communications network 100 may alternatively support a younger system than a 5G system. The wireless communications network 100 may support other technologies such as, particularly, Long-Term Evolution (LTE) system, LTE-Advanced/LTE-Advanced Pro, e.g. LTE Frequency Division Duplex (FDD), LTE Time Division Duplex (TDD), LTE Half-Duplex Frequency Division Duplex (HD-FDD), and LTE operating in an unlicensed band. The wireless communications network 100 may support yet other technologies such as, for example, License-Assisted Access (LAA), Narrow Band Internet of Things (NB-IoT), Machine Type Communication (MTC), MulteFire, Wideband Code Division Multiplexing Access (WCDMA), Universal Terrestrial Radio Access (UTRA) TDD, Global System for Mobile communications (GSM) network, Enhanced Data for GSM Evolution (EDGE) network, GSM/EDGE Radio Access Network (GERAN) network, Ultra-Mobile Broadband (UMB), network comprising of any combination of Radio Access Technologies (RATs) such as e.g., Multi-Standard Radio (MSR) base stations, multi-RAT base stations etc., any 3rd Generation Partnership Project (3GPP) cellular network, WiFi networks, Worldwide Interoperability for Microwave Access (WiMax), or any cellular network or system. Thus, although terminology from 5G/NR and LTE may be used in this disclosure to exemplify embodiments herein, this should not be seen as limiting the scope of the embodiments herein to only the aforementioned systems.

The wireless communications network 100 comprises a plurality of network nodes, whereof a network node 110 is depicted in the non-limiting example of FIG. 2. The network node 110 may be a radio network node, such as a radio base station, or any other network node with similar features capable of serving a wireless device, such as a user equipment or a machine type communication device, in the wireless communications network 100. The network node 110 may be a radio base station or transmission point operating on NR, for example a New Radio (NR) NodeB (gNB). The wireless communications network 100 covers a geographical area which may be divided into cell areas, wherein each cell area may be served by a network node, although, one radio network node may serve one or several cells. The wireless communications network 100 comprises at least a cell 120. In the non-limiting example depicted in FIG. 2, the network node 110 serves the cell 120. The network node 110 may be of different classes, such as, e.g., macro base station (BS), home BS or pico BS, based on transmission power and thereby also cell size. The network node 110 may be directly connected to one or more core networks, e.g., a 5GC network, which may in turn comprise a plurality of network nodes. The one or more core networks are not depicted in FIG. 2 to simplify the Figure. In some examples, the network node 110 may be a distributed node, such as a virtual node in the cloud, and it may perform its functions partially, on the cloud.

A plurality of wireless devices are located in the wireless communication network 100, whereof a wireless device 130, which may also be referred to as a device or as a first wireless device, is depicted in the non-limiting example of FIG. 2. The wireless device 130, e.g., a UE, may be a wireless communication device which may also be known as e.g., a mobile terminal, wireless terminal and/or mobile station, a mobile telephone, cellular telephone, or laptop with wireless capability, just to mention some further examples. The wireless device 130 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet, Machine-to-Machine (M2M) device, device equipped with a wireless interface, such as a printer or a file storage device, modem, or any other radio network unit capable of communicating over a radio link in a communications system. The wireless device 130 comprised in the wireless communications network 100 is enabled to communicate wirelessly in the wireless communications network 100. The communication may be performed e.g., via a RAN, and possibly the one or more core networks 115, which may be comprised within the wireless communications network 100.

The wireless device 130 may be configured to communicate in the wireless communications network 100 with the network node 110 over a first carrier, e.g., a radio link. The first carrier may be a first uplink carrier 141, e.g., one of a supplementary uplink carrier and an NR uplink carrier. The first uplink carrier 141 is indicated in FIG. 2 with a light, continuous line. The wireless device 130 may be configured to communicate in the wireless communications network 100 with the network node 110 over a second carrier, e.g., a radio link. The second carrier may be a second uplink carrier 142, e.g., the one of a supplementary uplink carrier and an NR uplink carrier that the first carrier 141 is not. The second uplink carrier 142 is indicated in FIG. 2 with a dashed line. The wireless device 130 may be configured to communicate in the wireless communications network 100 with the network node 110 over a third carrier, e.g., a radio link. The third carrier may be a downlink carrier 143, e.g., an NR downlink carrier. The downlink carrier 143 is indicated in FIG. 2 with a bold continuous line.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In general, the usage of "first", "second", "third", "fourth", "fifth", "sixth" and/or "seventh" herein may be understood to be an arbitrary way to denote different elements or entities, and may be understood to not confer a cumulative or chronological character to the nouns they modify, unless otherwise noted, based on context.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

More specifically, the following are embodiments related to a wireless device, such as the wireless device 130, e.g., a UE, and a network node, such as the network node 110, e.g., an eNB.

Figure 3:
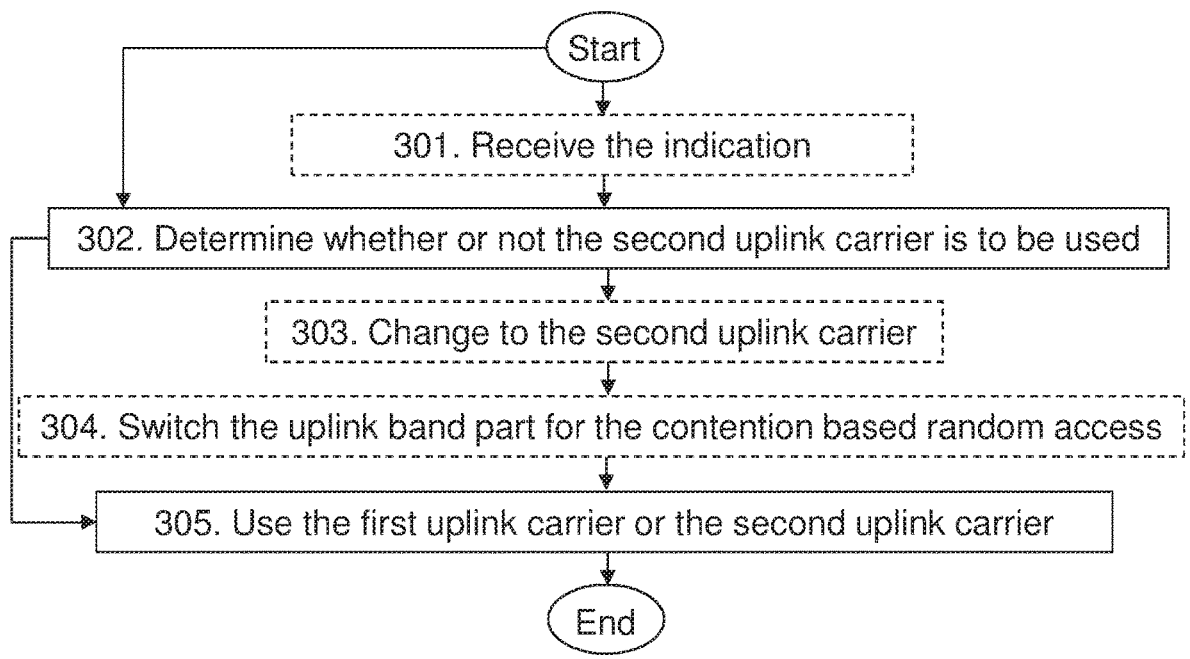
FIG. 3 is a flowchart depicting a method in a wireless device, according to embodiments herein.

Embodiments of a method, performed by the wireless device 130, will now be described with reference to the flowchart depicted in FIG. 3. The method may be understood to be for handling access to the cell 120. The wireless device 130 operates in the wireless communications network 100.

In some embodiments, the cell 120 is a New Radio (NR) cell.

Several embodiments are comprised herein. In some embodiments all the actions may be performed. In some embodiments, one or more actions may be performed. One or more embodiments may be combined, where applicable.

All possible combinations are not described to simplify the description. In FIG. 3, optional actions are indicated with dashed lines. Some actions may be performed in a different order than that shown in FIG. 3. It should be noted that the examples herein are not mutually exclusive. Components from one embodiment may be tacitly assumed to be present in another embodiment and it will be obvious to a person skilled in the art how those components may be used in the other exemplary embodiments.

Some embodiments herein will also be further described with some non-limiting examples, presented as different groups of examples. In the following description, the embodiments may be described in detail in context of Random Access for initial access. However, the methods described herein are not limited to the initial RACH access. The same methods may be applicable to RACH accesses triggered also for other events. A possible scenario applicable to embodiments here may be when the DL RSRP is high enough to use the NUL carrier, but the first preamble transmission(s) fails on NUL and the SUL carrier may be re-selected.

Action 301

In this Action 301, the wireless device 130 may receive an indication from the network node 110 indicating whether or not a change between the first uplink carrier 141 and the second uplink carrier 142 is allowed during a random access procedure to the cell 120. The cell 130 is served by the network node 110. The indication may indicate whether or not a change between the supplementary uplink carrier and the new radio uplink carrier is allowed during the random access procedure to the cell 120.

The receiving in this Action 301 may be performed via, e.g., the third link 143.

The indication may configure the wireless device 130 whether the carrier switch with a RACH procedure is enabled or disabled.

The configuration may be signalled via dedicated Radio Resource Control (RRC) signalling or MAC Control Element (CE) or other signalling options such as Downlink Control Information (DCI) command. In this case, the configuration may be UE specific. The configuration may also be signalled via System Information Block (SIB) signalling. In that case, the configuration may be cell specific.

The random access procedure may be understood to refer to for example, to the Random Access procedure as described, for example in 3GPP TS 38.321, v. 15.2.0. The expression "during the random access procedure" may be understood to comprise, for example, anytime between the initialization of the procedure prior to the preamble transmission, which takes place with the Message 1 (Msg 1) and until the procedure may be considered completed, which may be either Message 2 (Msg 2), or Message 4 (Msg4).

Action 302

In this Action 302, the wireless device 130 determines, given the first uplink carrier 141 in use during the random access procedure to the cell 120 served by the network node 110 operating in the wireless communications network 100, whether or not the second uplink carrier 142 is to be used during the random access procedure to the cell 120, instead of the first uplink carrier 141.

The determining in this Action 302 may be understood herein as e.g., calculating.

In some embodiments, the first uplink carrier 141 is one of a supplementary uplink carrier and a new radio uplink carrier, and the second uplink carrier 142 is the other of the supplementary uplink carrier and the new radio uplink carrier.

In some particular embodiments, the first uplink carrier 141 may be the NUL carrier, and the second uplink carrier 142 may be the SUL carrier.

In some examples, the determining in this Action 302 may be performed at any time.

In some examples, the determining in this Action 302 may be performed at least one time, during the access procedure to the cell 120.

In some embodiments, the determining in this Action 302 may be performed at any time, and at least one time, during the access procedure, that is, the random access procedure, to the cell 120.

The determining in this Action 302 may be based on one or more criteria. The criteria may be based on signalling received from the network node 110, and/or one or more characteristics of: a) the random access procedure, b) any of the first uplink carrier 141 and the second uplink carrier 142, e.g., load, and/or c) the wireless communications device 130, e.g., speed.

According to a first criterion, in some embodiments, the determining 302 may be performed for every preamble transmission within the random access procedure to the cell 120.

In a first group of examples, within an ongoing RACH access procedure for the wireless device 130, the wireless device 130 may perform multiple RACH access attempts to eventually complete the RACH access successfully. The wireless device 130 may be allowed to measure the DL RSRP, and compare to the predefined threshold, for every RACH preamble transmission, so that the wireless device 130 may select the suitable carrier for each preamble transmission. This may be understood to mean that the carrier for RACH accesses may change between every preamble transmission within the same RACH access procedure. The first group of examples may be understood to correspond to examples of performing the determining in Action 302, according to the first criterion.

According to a second criterion, in some embodiments, the determining 302 may be performed after one of: a) a number of attempts to access the cell 120 within the random access procedure to the cell 120; and b) an expiration of a timer within the random access procedure to the cell 120.

In a second group of examples, the network, e.g., the network node 110, may configure rules for how the wireless device 130 may select SUL or NUL carrier during random accesses, e.g., via the indication received in Action 301, or sent in Action 401, as described later. The wireless device 130 may first try one selected carrier, e.g., the selection may be made based on if the DL RSRP is lower than a threshold, for a configured number of RACH access attempts, and in case the wireless device 130 is not able to successfully complete the RA procedure on the selected carrier, the wireless device 130 may select the other carrier and continue with new RACH access attempts on that carrier. Alternatively, when the wireless device 130 has tried the configured number of RACH accesses, it may be allowed to re-select carrier based on if the DL RSRP is lower than a threshold. The wireless device 130 may be allowed to switch back to the initial carrier again after a configured number of RACH access attempts. Another option may be to use an additional timer defined in order to limit the time for the wireless device 130 to stay on the same carrier. When the timer expires, the wireless device 130 may switch to the other carrier. The second group of examples may be understood to correspond to examples of performing the determining in Action 302, according to the second criterion.

According to a third criterion, in some embodiments, the determining in this Action 302 may be based one at least one of: a) a first load in the first uplink carrier 141 and a second load in the second uplink carrier 142; b) a strength, that is, a first strength, e.g., RSRP, of a downlink carrier 143 in the cell 120; and c) a first quality, e.g., RSRQ, of the first uplink carrier 141 and a second quality in the second uplink carrier 142.

In a third group of examples, the selection or switch of the carriers for RACH accesses may be made based on the RACH load together with the DL RSRP on the carriers. The RACH load may be periodically measured on each carrier and signaled to the wireless device 130 in the DL by the network node 110, e.g., a gNB. The wireless device 130 may then be able to reselect the carrier during the ongoing RA procedure based on both the RACH load and the DL RSRP. In one case, the wireless device 130 may select the NUL carrier in case the DL RSRP is above the predefined threshold and the RACH load on the NUL carrier is below a predefined threshold. In another case, the wireless device 130 may consider only the RACH load on the carriers. In this case, the wireless device 130 may reselect carrier for RACH accesses based only on the RACH load, that is, the wireless device 130 may reselect NUL carrier for the next RACH accesses when the SUL carrier has high RACH load. The third group of examples may be understood to correspond to examples of performing the determining in Action 302, according the third criterion.

According to a fourth criterion, in some embodiments, the determining 302 may be based on a speed of the wireless device 130.

In a fourth group of examples, during an ongoing Random access procedure for a wireless device 130, the wireless device 130 may periodically monitor its mobility status, and the wireless device 130 may determine if a carrier switch may be needed depending on its changed mobility status. In case the wireless device 130 may be slowly moving or static, the wireless device 130 may choose to use the same carrier, which may be selected based on the measurement DL RSRP, compared to the predefined threshold when the first RACH access takes place. In case the wireless device 130 may have started to move at medium or high speeds, the wireless device 130 may choose to switch to SUL carrier for the next RACH access attempts. The fourth group of examples may be understood to correspond to examples of performing the determining in Action 302, according the fourth criterion.

According to a fifth criterion, in some embodiments, the determining 302 may be based on a condition based on at least one of a Time_to_Trigger and a hysteresis.

In a fifth group of examples, additional parameters including Hysteresis and Time_to:Trigger may be defined for the carrier switch. In one option, the wireless device 130 may select the SUL carrier only when the measured DL RSRP is below the predefined threshold for a time period of Time_to_Trigger. Another option may be that the wireless device 130 may select the SUL carrier only when the measured DL RSRP is lower than the predefined threshold minus Hysteresis for a time period of Time_to_Trigger. The main purpose in this embodiment is to avoid Ping-Pong for carrier switches due to the unsmooth change of measured DL RSRP. In this case, the wireless device 130 may then only select the SUL carrier for RACH accesses when the DL RSRP has been consistently worse than the DL-RSRP threshold for a time period. The fifth group of examples may be understood to correspond to examples of performing the determining in Action 302, according the firth criterion.

According to a sixth criterion, in some embodiments, the determining 302 may be based on the received indication in Action 301.

In a sixth group of examples, the network, e.g., the network node 110, may configure the wireless device 130 whether the carrier switch with a RACH procedure is enabled or disabled. The configuration may be signalled via dedicated Radio Resource Control (RRC) signalling or MAC Control Element (CE) or other signalling options such as Downlink Control Information (DCI) command. In this case, the configuration may be UE specific. The configuration may also be signalled via System Information Block (SIB) signalling. In that case, the configuration may be cell specific. The sixth group of examples may be understood to correspond to examples of performing the determining in Action 302, according the sixth criterion.

Action 303

In this Action 303, the wireless device 130 may change, to continue the random access procedure to the cell 120 and based on the result of the determination in Action 302, from the first uplink carrier 141 to the second uplink carrier 142 to access the cell 120. The changing 303 may be performed at any time, and at least one time, during the random access procedure to the cell 120.

Action 304

In this Action 304, the wireless device 130 may switch an uplink bandwidth part used for the random access procedure to the cell 120, for a contention based random access. The switching may be based on at least one of: a) the number of attempts to access the cell 120 within the random access procedure to the cell 120; b) the expiration of a timer within the random access procedure to the cell 120; c) the first load in the first uplink carrier 141 and the second load in the second uplink carrier 142; d) the strength, e.g., the first strength, of the first uplink carrier 141 and a second strength in the second uplink carrier 142; and e) the first quality of the first uplink carrier 141 and the second quality in the second uplink carrier 142.

According to a seventh criterion, in some examples, the determining in Action 302 may be performed based on the performed switch in this Action 304.

In a seventh group of examples, the methods described in the second and third group of examples may be applied to a UL Bandwidth Part (BWP) switch. This may be understood to mean that the wireless device 130 may switch UL BWP for Contention based random access (CBRA) after a number of unsuccessful preamble transmission attempts on the active BWP. The conditions of when it may be allowed to switch UL BWP for CBRA may be based on a configured number of preamble transmissions, based on a timer or based on a measure of the RACH load on the UL BWPs. The seventh group of examples may be understood to correspond to examples of performing the determining in Action 302, according the seventh criterion.

Action 305

In this Action 305, the wireless device 130 uses, based on a result of the determination of Action 302, one of the first uplink carrier 141 and the second uplink carrier 142, to continue the random access procedure to the cell 120. To use in this Action 305, may be understood as, for example, to transmit, or receive. For example, to use may be to send signalling.

By the wireless device 130 determining whether or not to use the second uplink carrier during the random access procedure, and then using one of the uplink carriers based on the determination, the wireless device 130 is enabled to change UL carrier, e.g., from SUL to NUL, or vice versa, during an ongoing random access procedure, based on one or more criteria. This allows the wireless device 130 to optimize the random access procedure by for example, obtaining better coverage, e.g., in case of pathloss variation, with shorter delay, e.g., in cases where the wireless device 130 may choose the uplink carrier with lower load. This ability to determine or not whether to change uplink carrier, may in turn allow the success ratio for the random access procedure to be improved, decreasing the probability of failures, and decreasing the random access delay.

Figure 4:
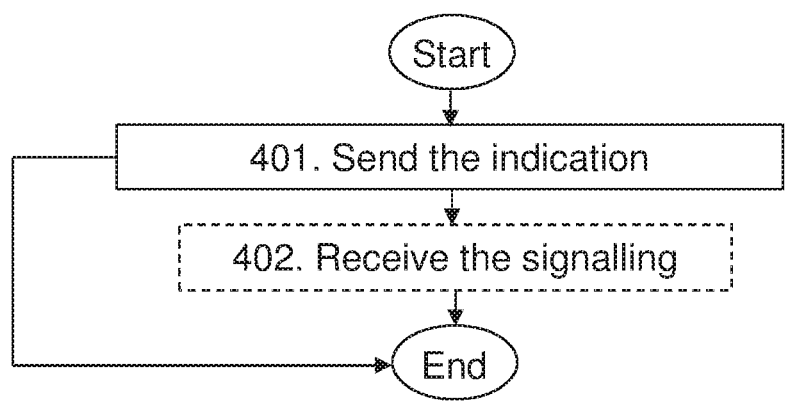
FIG. 4 is a flowchart depicting a method in a network node, according to embodiments herein.

Embodiments of a method, performed by the network node 110, will now be described with reference to the flowchart depicted in FIG. 4. The method may be understood to be for handling access by the wireless device 130 to the cell 120. The cell is served by the network node 110. The network node 110 and the wireless device 130 operate in the wireless communications network 100.

Several embodiments are comprised herein. In some embodiments all the actions may be performed. In some embodiments, one or more actions may be performed. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. In FIG. 4, optional actions are indicated with dashed lines. Some actions may be performed in a different order than that shown in FIG. 4.

The detailed description of some of the following corresponds to the same references provided above, in relation to the actions described for the user equipment 130, and will thus not be repeated here to simplify the description. For example, in some embodiments, the cell 120 is a New Radio (NR) cell.

Action 401

In this Action 401, the network node 110 sends the indication to the wireless device 130 indicating whether or not a change between the first uplink carrier 141 and the second uplink carrier 142 is allowed during the random access procedure to the cell 120. The indication may indicate whether or not a change between the supplementary uplink carrier and the new radio uplink carrier is allowed during the random access procedure to the cell 120.

The sending, e.g., broadcasting, in this Action 401 may be performed via, e.g. the downlink carrier 143.

As stated earlier, the network node 110 may configure the wireless device 130 whether the carrier switch with a RACH procedure is enabled or disabled. The configuration may be signalled via dedicated Radio Resource Control (RRC) signalling or MAC Control Element (CE) or other signalling options such as Downlink Control Information (DCI) command. In this case, the configuration may be UE specific. The configuration may also be signalled via System Information Block (SIB) signalling.

Action 402

In this Action 402, the network node 110 receives, given the first uplink carrier 141 in use during the random access procedure to the cell 120 with the wireless device 130, signalling for the random access procedure to the cell 120 using the second uplink carrier 142, instead of the first uplink carrier 141. The receiving 402 is based on the sent indication.

The first uplink carrier 141 may be one of the supplementary uplink carrier and the new radio uplink carrier. The second uplink carrier 142 may be the other of the supplementary uplink carrier and the new radio uplink carrier.

In some embodiments, the first uplink carrier 141 is one of the supplementary uplink carrier and the new radio uplink carrier, and the second uplink carrier 142 is the other of the supplementary uplink carrier and the new radio uplink carrier.

In some examples, the receiving in this Action 402 may be performed at any time during the access procedure to the cell 120.

In some examples, the receiving in this Action 402 may be performed at least one time during the access procedure to the cell 120.

In some embodiments, the receiving in this Action 402 may be performed at any time, and at least one time, during the access procedure, that is, the random access procedure to the cell 120.

The receiving in this Action 402 may be based on the one or more criteria, described above. The criteria may be based on signalling sent by the network node 110, e.g., the indication, and/or one or more characteristics of: a) the random access procedure, b) any of the first uplink carrier 141 and the second uplink carrier 142, e.g., load, and/or c) the wireless communications device 130, e.g., speed.

According to the first criterion, in some examples, the receiving in this Action 402 may be performed after one or more preamble transmissions within the random access procedure to the cell 120.

According to the second criterion, in some examples, the receiving in this Action 402 may be performed after one of: a) the number of attempts to access the cell 120 within the random access procedure to the cell 120; and b) the expiration of the timer within the random access procedure to the cell 120.

According to the third criterion, in some examples, the receiving in this Action 402 may be based one at least one of: a) the first load in the first uplink carrier 141 and the second load in the second uplink carrier 142; b) the strength, e.g., the first strength, of the downlink carrier 143 in the cell 120; and c) the first quality of the first uplink carrier 141 and the second quality in the second uplink carrier 142.

According to the fourth criterion, in some examples, the receiving in this Action 402 may be based on the speed of the wireless device 130.

According to the fifth criterion, in some examples, the receiving in this Action 402 may be based on the condition based on at least one of the Time_to_Trigger and the hysteresis.

According to the seventh criterion, in some examples, the receiving in this Action 402 may be performed based on the switch as described earlier in Action 304.

Certain embodiments disclosed herein may provide one or more of the following technical advantage(s), which may be summarized as that they provide for a mechanism for random access to the cell 120, e.g., an NR cell, with SUL carrier, which is enhanced so that the success ratio for RACH accesses may be improved, and the RACH access delay may be decreased.

FIG. 5 depicts two different examples in panels a) and b), respectively, of the arrangement that the wireless device 130 may comprise. In some embodiments, the wireless device 130 may comprise the following arrangement depicted in FIG. 5a. The wireless device 130 may be understood to be for handling access to the cell 120. The wireless device 130 is configured to operate in the wireless communications network 100.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments. In FIG. 5, optional units are indicated with dashed boxes.

The detailed description of some of the following corresponds to the same references provided above, in relation to the actions described for the wireless device 130, and will thus not be repeated here. For example, in some embodiments, the cell 120 may be configured to be a New Radio (NR) cell.

The wireless device 130 is configured to perform the determining of Action 302, e.g. by means of a determining unit 501 within the wireless device 130, configured to, determine, given the first uplink carrier 141 configured to be in use during the random access procedure to the cell 120 configured to be served by the network node 110 configured to operate in the wireless communications network 100, whether or not the second uplink carrier 142 is to be used during the random access procedure to the cell 120, instead of the first uplink carrier 141. The determining unit 501 may be a processor 507 of the wireless device 130, or an application running on such processor.

The wireless device 130 is configured to perform the using of Action 305, e.g., by means of a using unit 502 within the wireless device 130, configured to, use, based on the result of the determination, one of the first uplink carrier 141 and the second uplink carrier 142, to continue the random access procedure to the cell 120. The using unit 502 may be the processor 507 of the wireless device 130, or an application running on such processor.

In some embodiments, the first uplink carrier 141 may be configured to be one of the supplementary uplink carrier and the new radio uplink carrier, and the second uplink carrier 142 may be configured to be the other of the supplementary uplink carrier and the new radio uplink carrier.

To determine may be configured to be performed at any time, and at least one time, during the random access procedure to the cell 120.

In some embodiments, the wireless device 130 may be further configured to perform the changing of Action 302, e.g., by means of a changing unit 503 within the wireless device 130, configured to, change, to continue the random access procedure to the cell 120 and based on the result of the determination, from the first uplink carrier 141 to the second uplink carrier 142 to access the cell 120, wherein to change may be configured to be performed at any time, and at least one time, during the random access procedure to the cell 120. The changing unit 503 may be the processor 507 of the wireless device 130, or an application running on such processor.

In some embodiments, to determine may be configured to be performed for every preamble transmission within the random access procedure to the cell 120.

In some embodiments, to determine may be configured to be performed after one of: a) the number of attempts to access the cell 120 within the random access procedure to the cell 120; and b) the expiration of the timer within the random access procedure to the cell 120.

In some embodiments, to determine may be configured to be based one at least one of: a) the first load in the first uplink carrier 141 and the second load in the second uplink carrier 142; b) the first strength of a downlink carrier 143 in the cell 120; and c) the first quality of the first uplink carrier 141 and the second quality in the second uplink carrier 142.

In some embodiments, to determine may be configured to be based on the speed of the wireless device 130.

In some embodiments, to determine may be configured to be based on the condition based on at least one of the Time_to_Trigger and the hysteresis.

In some embodiments, the wireless device 130 may be further configured to perform the receiving of Action 301, e.g. by means of a receiving unit 504 within the wireless device 130, configured to, receive the indication from the network node 110 indicating whether or not the change between the first uplink carrier 141 and the second uplink carrier 142 is allowed during the random access procedure to the cell 120, and wherein to determine may be configured to be based on the received indication. The receiving unit 504 may be the processor 507 of the wireless device 130, or an application running on such processor.

In some embodiments, the wireless device 130 may be further configured to perform the switching of Action 304, e.g., by means of a switching unit 505 within the wireless device 130, configured to, switch the uplink bandwidth part configured to be used for the random access procedure to the cell 120, for the contention based random access, based on at least one of: a) the number of attempts to access the cell 120 within the random access procedure to the cell 120; b) the expiration of the timer within the random access procedure to the cell 120; c) the first load in the first uplink carrier 141 and the second load in the second uplink carrier 142; d) the first strength of the first uplink carrier 141 and the second strength in the second uplink carrier 142; and e) the first quality of the first uplink carrier 141 and the second quality in the second uplink carrier 142. The switching unit 505 may be the processor 507 of the wireless device 130, or an application running on such processor.

Other units 506 may be comprised in the wireless device 130.

The embodiments herein in the wireless device 130 may be implemented through one or more processors, such as a processor 507 in the wireless device 130 depicted in FIG. 5a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the wireless device 130. One such carrier may be in the form of a CD ROM disc. It is however feasible with other data carriers such as a memory stick. The computer program code may furthermore be provided as pure program code on a server and downloaded to the wireless device 130.

The wireless device 130 may further comprise a memory 508 comprising one or more memory units. The memory 508 is arranged to be used to store obtained information, store data, configurations, schedulings, and applications etc. to perform the methods herein when being executed in the wireless device 130.

In some embodiments, the wireless device 130 may receive information from, e.g., the network node 110, through a receiving port 509. In some embodiments, the receiving port 509 may be, for example, connected to one or more antennas in the wireless device 130. In other embodiments, the wireless device 130 may receive information from another structure in the wireless communications network 100 through the receiving port 509. Since the receiving port 509 may be in communication with the processor 507, the receiving port 509 may then send the received information to the processor 507. The receiving port 509 may also be configured to receive other information.

The processor 507 in the wireless device 130 may be further configured to transmit or send information to e.g., the network node 110, and/or another structure in the wireless communications network 100, through a sending port 510, which may be in communication with the processor 507, and the memory 508.

Those skilled in the art will also appreciate that the determining unit 501, the using unit 502, the changing unit 503, the receiving unit 504, the switching unit 505 and the other units 506 described above may refer to a combination of analog and digital circuits, and/or one or more processors configured with software and/or firmware, e.g., stored in memory, that, when executed by the one or more processors such as the processor 507, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 501-506 described above may be implemented as one or more applications running on one or more processors such as the processor 507.

Thus, the methods according to the embodiments described herein for the wireless device 130 may be respectively implemented by means of a computer program 511 product, comprising instructions, i.e., software code portions, which, when executed on at least one processor 507, cause the at least one processor 507 to carry out the actions described herein, as performed by the wireless device 130. The computer program 511 product may be stored on a computer-readable storage medium 512. The computer-readable storage medium 512, having stored thereon the computer program 511, may comprise instructions which, when executed on at least one processor 507, cause the at least one processor 507 to carry out the actions described herein, as performed by the wireless device 130. In some embodiments, the computer-readable storage medium 512 may be a non-transitory computer-readable storage medium, such as a CD ROM disc, or a memory stick. In other embodiments, the computer program 511 product may be stored on a carrier containing the computer program 511 just described, wherein the carrier is one of an electronic signal, optical signal, radio signal, or the computer-readable storage medium 512, as described above.

The wireless device 130 may comprise an interface unit to facilitate, or a communication interface configured to facilitate, communications between the wireless device 130 and other nodes or devices, e.g., the network node 110, the host computer 810, or any of the other nodes. In some particular examples, the interface may, for example, include a transceiver configured to transmit and receive radio signals over an air interface in accordance with a suitable standard.

In other embodiments, the wireless device 130 may comprise the following arrangement depicted in FIG. 5b. The wireless device 130 may comprise a processing circuitry 507, e.g., one or more processors such as the processor 507, in the wireless device 130 and the memory 508. The wireless device 130 may also comprise a radio circuitry 513, which may comprise e.g., the receiving port 509 and the sending port 510. The processing circuitry 507 may be configured to, or operable to, perform the method actions according to FIG. 3, and/or FIGS. 8-12, in a similar manner as that described in relation to FIG. 5a. The radio circuitry 513 may be configured to set up and maintain at least a wireless connection with the network node 110. Circuitry may be understood herein as a hardware component.

Hence, embodiments herein also relate to the wireless device 130 operative to operate in the wireless communications network 100. The wireless device 130 may comprise the processing circuitry 507 and the memory 508, said memory 508 containing instructions executable by said processing circuitry 507, whereby the wireless device 130 is further operative to perform the actions described herein in relation to the wireless device 130, e.g., in FIG. 3, and/or FIGS. 8-12.

FIG. 6 depicts two different examples in panels a) and b), respectively, of the arrangement that the network node 110 may comprise. In some embodiments, the network node 110 may comprise the following arrangement depicted in FIG. 6a. The network node 110 may be understood to be for handling access by the wireless device 130 to the cell 120. The cell 120 is configured to be served by the network node 110. The network node 110 and the wireless device 130 are configured to operate in the wireless communications network 100.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments. In FIG. 6, optional units are indicated with dashed boxes.

The network node 110 is configured to perform the sending of Action 401 action, e.g. by means of a sending unit 601 within the network node 110, configured to send the indication to the wireless device 130 indicating whether or not the change between the first uplink carrier 141 and the second uplink carrier 142 is allowed during the random access procedure to the cell 120. The sending unit 601 may be a processor 604 of the network node 110, or an application running on such processor.

The network node 110 is configured to perform the receiving of Action 402, e.g., by means of a receiving unit 602 within the network node 110, configured to receive, given the first uplink carrier 141 configured to be in use during the random access procedure to the cell 120 with the wireless device 130, signalling for the random access procedure to the cell 120 using the second uplink carrier 142, instead of the first uplink carrier 141, wherein the receiving 402 is configured to be based on the sent indication. The receiving unit 602 may be the processor 604 of the network node 110, or an application running on such processor.

In some embodiments, the cell 120 may be configured to be a New Radio (NR) cell.

In some embodiments, the first uplink carrier 141 may be configured to be one of the supplementary uplink carrier and the new radio uplink carrier, and the second uplink carrier 142 may be configured to be the other of the supplementary uplink carrier and the new radio uplink carrier.

In some embodiments, to receive may be configured to be performed at any time, and at least one time, during the random access procedure to the cell 120.

To receive may be configured to be performed after one or more preamble transmissions within the random access procedure to the cell 120.

In some embodiments, to receive may be configured to be performed after one of: a) the number of attempts to access the cell 120 within the random access procedure to the cell 120; and b) the expiration of the timer within the random access procedure to the cell 120.

In some embodiments, to receive may be configured to be based one at least one of: a) the first load in the first uplink carrier 141 and the second load in the second uplink carrier 142; b) the first strength of the downlink carrier 143 in the cell 120; and c) the first quality of the first uplink carrier 141 and the second quality in the second uplink carrier 142.

In some embodiments, to receive may be configured to be based on the speed of the wireless device 130.

In some embodiments, to receive may be configured to be based on the condition based on at least one of the Time_to_Trigger and the hysteresis.

Other units 603 may be comprised in the network node 110.

The embodiments herein in the network node 110 may be implemented through one or more processors, such as a processor 604 in the network node 110 depicted in FIG. 6a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 605 comprising one or more memory units. The memory 605 is arranged to be used to store obtained information, store data, configurations, schedulings, and applications etc. to perform the methods herein when being executed in the network node 110.

In some embodiments, the network node 110 may receive information from, e.g., the wireless device 130, through a receiving port 606. In some embodiments, the receiving port 606 may be, for example, connected to one or more antennas in network node 110. In other embodiments, the network node 110 may receive information from another structure in the wireless communications network 100 through the receiving port 606. Since the receiving port 606 may be in communication with the processor 604, the receiving port 606 may then send the received information to the processor 604. The receiving port 606 may also be configured to receive other information.

The processor 604 in the network node 110 may be further configured to transmit or send information to e.g., the wireless device 130, another structure in the wireless communications network 100, through a sending port 607, which may be in communication with the processor 604, and the memory 605.

Those skilled in the art will also appreciate that the sending unit 601, the receiving unit 602, and the other units 603 described above may refer to a combination of analog and digital circuits, and/or one or more processors configured with software and/or firmware, e.g., stored in memory, that, when executed by the one or more processors such as the processor 604, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 601-603 described above may be implemented as one or more applications running on one or more processors such as the processor 604.

Thus, the methods according to the embodiments described herein for the network node 110 may be respectively implemented by means of a computer program 608 product, comprising instructions, i.e., software code portions, which, when executed on at least one processor 604, cause the at least one processor 604 to carry out the actions described herein, as performed by the network node 110. The computer program 608 product may be stored on a computer-readable storage medium 609. The computer-readable storage medium 609, having stored thereon the computer program 608, may comprise instructions which, when executed on at least one processor 604, cause the at least one processor 604 to carry out the actions described herein, as performed by the network node 110. In some embodiments, the computer-readable storage medium 609 may be a non-transitory computer-readable storage medium, such as a CD ROM disc, or a memory stick. In other embodiments, the computer program 608 product may be stored on a carrier containing the computer program 608 just described, wherein the carrier is one of an electronic signal, optical signal, radio signal, or the computer-readable storage medium 609, as described above.

The network node 110 may comprise an interface unit to facilitate, or a communication interface configured to facilitate, communications between the wireless device 130, the host computer 810, or any of the other nodes. The interface may, for example, include a transceiver configured to transmit and receive radio signals over an air interface in accordance with a suitable standard.

In other embodiments, the network node 110 may comprise the following arrangement depicted in FIG. 6b. The network node 110 may comprise a processing circuitry 604, e.g., one or more processors such as the processor 604, in the network node 110 and the memory 605. The network node 110 may also comprise a radio circuitry 610, which may comprise e.g., the receiving port 606 and the sending port 607. The processing circuitry 604 may be configured to, or operable to, perform the method actions according to FIG. 4, and/or FIGS. 8-12, in a similar manner as that described in relation to FIG. 6a. The radio circuitry 610 may be configured to set up and maintain at least a wireless connection with the wireless device 130. Circuitry may be understood herein as a hardware component.

Hence, embodiments herein also relate to the network node 110 operative to operate in the wireless communications network 100. The network node 110 may comprise the processing circuitry 604 and the memory 605, said memory 605 containing instructions executable by said processing circuitry 604, whereby the network node 110 is further operative to perform the actions described herein in relation to the network node 110, e.g., in FIG. 4, and/or FIGS. 8-12.

Embodiments herein may relate to: SUL, NR, and Random access. Particularly, to a NR cell with SUL carrier that has a NR UL carrier and a SUL carrier, wherein the UE behavior for random access to the NR cell with SUL carrier may need to be improved.

The following are a list of examples of embodiments disclosed herein:

1. A method, performed by a wireless device (130), for handling access to a cell (120), the cell (120) being a New Radio (NR) cell, the wireless device (130) operating in a wireless communications network (100), the method comprising:

determining (302), given a first uplink carrier (141) in use during a random access procedure to the cell (120) served by a network node (110) operating in the wireless communications network (100), whether or not a second uplink carrier (142) is to be used during the random access procedure to the cell (120), instead of the first uplink carrier (141), wherein the first uplink carrier (141) is one of a supplementary uplink carrier and a new radio uplink carrier, and the second uplink carrier (142) is the other of the supplementary uplink carrier and the new radio uplink carrier, and using (305), based on a result of the determination, one of the first uplink carrier (141) and the second uplink carrier (142), to continue the random access procedure to the cell (120).

2. The method according to example 1, wherein the determining (302) is performed at any time, and at least one time, during the access procedure to the cell (120).
3. The method according to any of examples 1-2, wherein the method further comprises:
    changing (303), to continue the random access procedure to the cell (120) and based on the result of the determination, from the first uplink carrier (141) to the second uplink carrier (142) to access the cell (120), wherein the changing (303) is performed at any time, and at least one time, during the random access procedure to the cell (120).
4. The method according to any of examples 1-3, wherein the determining (302) is performed for every preamble transmission within the random access procedure to the cell (120).
5. The method according to any of examples 1-4, wherein the determining (302) is performed after one of:
    a. a number of attempts to access the cell (120) within the random access procedure to the cell (120);
    b. an expiration of a timer within the random access procedure to the cell (120).
6. The method according to any of examples 1-5, wherein the determining (302) is based one at least one of:
    a. a first load in the first uplink carrier (141) and a second load in the second uplink carrier (142);
    b. a strength of a downlink carrier (143) in the cell (120); and
    c. a first quality of the first uplink carrier (141) and a second quality in the second uplink carrier (142).
7. The method according to any of examples 1-6, wherein the determining (302) is based on a speed of the wireless device (130).
8. The method according to any of examples 1-7, wherein the determining (302) is based on a condition based on at least one of a Time_to_Trigger and a hysteresis.
9. The method according to any of examples 1-8, the method further comprising:
    receiving (301) an indication from the network node (110) indicating whether or not a change between the supplementary uplink carrier and the new radio uplink carrier is allowed during the random access procedure to the cell (120), and wherein the determining (302) is based on the received indication.
10. The method according to any of examples 1-9, the method further comprising:
    switching (304) an uplink bandwidth part used for the random access procedure to the cell (120), for a contention based random access, based on at least one of:
    a. a number of attempts to access the cell (120) within the random access procedure to the cell (120);
    b. an expiration of a timer within the random access procedure to the cell (120)
    c. a first load in the first uplink carrier (141) and a second load in the second uplink carrier (142);
    d. a strength of a downlink carrier (143) in the cell (120); and
    e. a first quality of the first uplink carrier (141) and a second quality in the second uplink carrier (142).
11. A method, performed by a network node (110), for handling access by a wireless device (130) to a cell (120), the cell (120) being a New Radio (NR) cell served by the network node (110), the network node (110) and the wireless device (130) operating in a wireless communications network (100), the method comprising:
    sending (401) an indication to the wireless device (130) indicating whether or not a change between a supplementary uplink carrier and a new radio uplink carrier is allowed during the random access procedure to the cell (120),
    receiving (402), given a first uplink carrier (141) in use during a random access procedure to the cell (120) with the wireless device (130), signalling for the random access procedure to the cell (120) using a second uplink carrier (142), instead of the first uplink carrier (141), wherein the first uplink carrier (141) is one of a supplementary uplink carrier and a new radio uplink carrier, and the second uplink carrier (142) is the other of the supplementary uplink carrier and the new radio uplink carrier, and wherein the receiving (402) is based on the sent indication.
12. The method according to example 11, wherein the receiving (402) is performed at any time, and at least one time, during the access procedure to the cell (120).
13. The method according to any of examples 11-12, wherein the receiving (402) is performed after one or more preamble transmissions within the random access procedure to the cell (120).
14. The method according to any of examples 11-13, wherein the receiving (402) is performed after one of:
    a. a number of attempts to access the cell (120) within the random access procedure to the cell (120);
    b. an expiration of a timer within the random access procedure to the cell (120).
15. The method according to any of examples 11-14, wherein the receiving (402) is based one at least one of:
    a. a first load in the first uplink carrier (141) and a second load in the second uplink carrier (142);
    b. a strength of a downlink carrier (143) in the cell (120); and
    c. a first quality of the first uplink carrier (141) and a second quality in the second uplink carrier (142).
16. The method according to any of examples 11-15, wherein the receiving (402) is based on a speed of the wireless device (130).
17. The method according to any of examples 11-16, wherein the receiving (402) is based on a condition based on at least one of a Time_to_Trigger and a hysteresis.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

As used herein, the expression "in some embodiments" has been used to indicate that the features of the embodiment described may be combined with any other embodiment or example disclosed herein.

As used herein, the expression "in some examples" has been used to indicate that the features of the example described may be combined with any other embodiment or example disclosed herein.

Further Extensions and Variations

Figure 7:
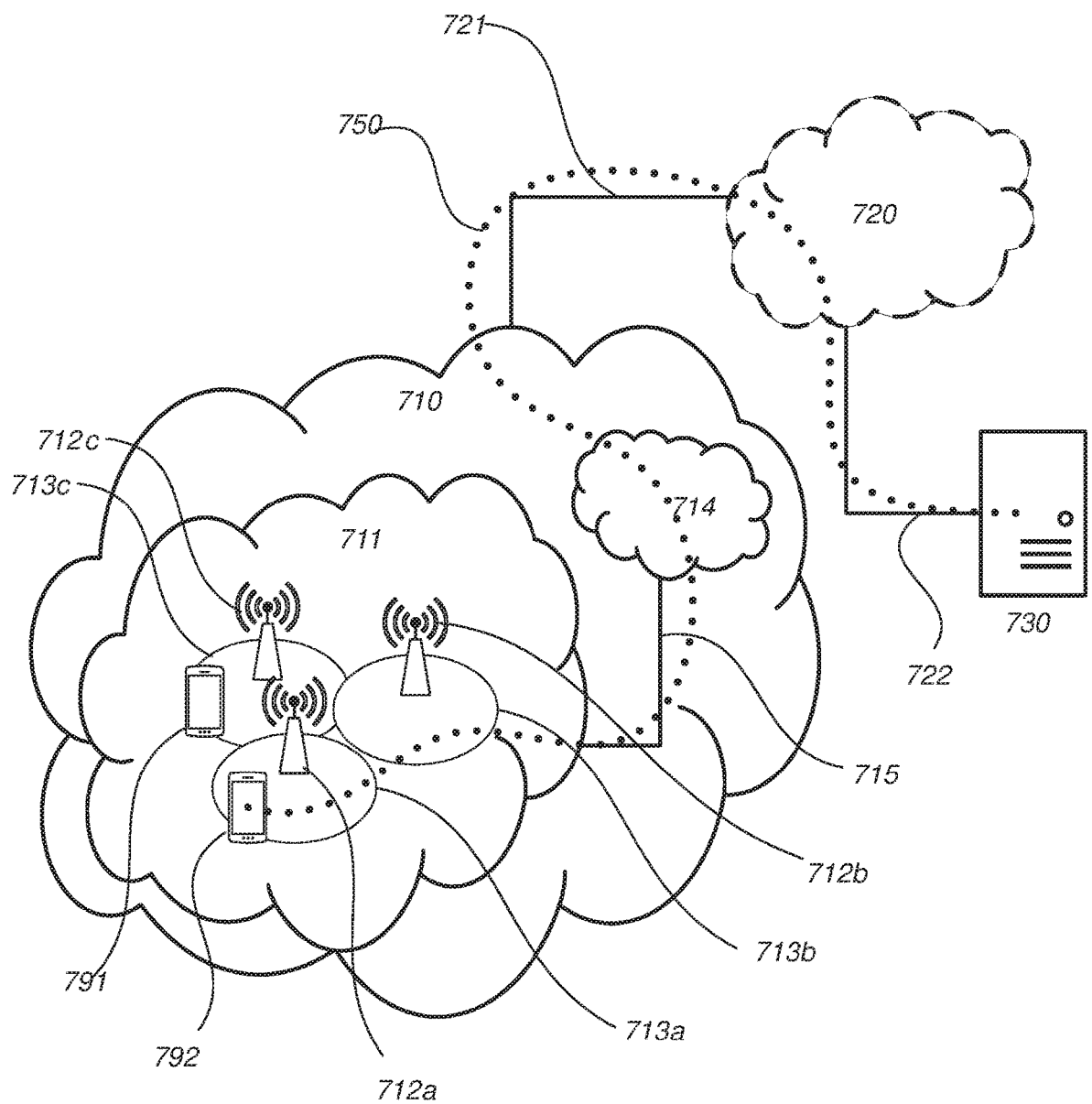
FIG. 7 is a schematic block diagram illustrating a telecommunication network connected via an intermediate network to a host computer, according to embodiments herein.

FIG. 7: Telecommunication Network Connected Via an Intermediate Network to a Host Computer in Accordance with Some Embodiments With reference to FIG. 7, in accordance with an embodiment, a communication system includes telecommunication network 710 such as the wireless communications network 100, for example, a 3GPP-type cellular network, which comprises access network 711, such as a radio access network, and core network 714. Access network 711 comprises a plurality of network nodes such as the network node 110. For example, base stations 712a, 712b, 712c, such as NBs, eNBs, gNBs or other types of wireless access points, each defining a corresponding coverage area 713a, 713b, 713c. Each base station 712a, 712b, 712c is connectable to core network 714 over a wired or wireless connection 715. A plurality of wireless devices, such as the wireless device 130 may be comprised in the wireless communications network 100. In FIG. 7, a first UE 791 located in coverage area 713c is configured to wirelessly connect to, or be paged by, the corresponding base station 712c. A second UE 792 in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712. Any of the UEs 791, 792 are examples of the wireless device 130.

Telecommunication network 710 is itself connected to host computer 730, which may be embodied in the hardware and/or software of a standalone server, a cloud-implemented server, a distributed server or as processing resources in a server farm. Host computer 730 may be under the ownership or control of a service provider, or may be operated by the service provider or on behalf of the service provider. Connections 721 and 722 between telecommunication network 710 and host computer 730 may extend directly from core network 714 to host computer 730 or may go via an optional intermediate network 720. Intermediate network 720 may be one of, or a combination of more than one of, a public, private or hosted network; intermediate network 720, if any, may be a backbone network or the Internet; in particular, intermediate network 720 may comprise two or more sub-networks (not shown).

The communication system of FIG. 7 as a whole enables connectivity between the connected UEs 791, 792 and host computer 730. The connectivity may be described as an over-the-top (OTT) connection 750. Host computer 730 and the connected UEs 791, 792 are configured to communicate data and/or signalling via OTT connection 750, using access network 711, core network 714, any intermediate network 720 and possible further infrastructure (not shown) as intermediaries. OTT connection 750 may be transparent in the sense that the participating communication devices through which OTT connection 750 passes are unaware of routing of uplink and downlink communications. For example, base station 712 may not or need not be informed about the past routing of an incoming downlink communication with data originating from host computer 730 to be forwarded (e.g., handed over) to a connected UE 791. Similarly, base station 712 need not be aware of the future routing of an outgoing uplink communication originating from the UE 791 towards the host computer 730.

In relation to FIGS. 8, 9, 10, 11, and 12, which are described next, it may be understood that a UE is an example of the wireless device 130, and that any description provided for the UE equally applies to the wireless device 130. It may be also understood that the base station is an example of the network node 110, and that any description provided for the base station equally applies to the network node 110.

Figure 8:
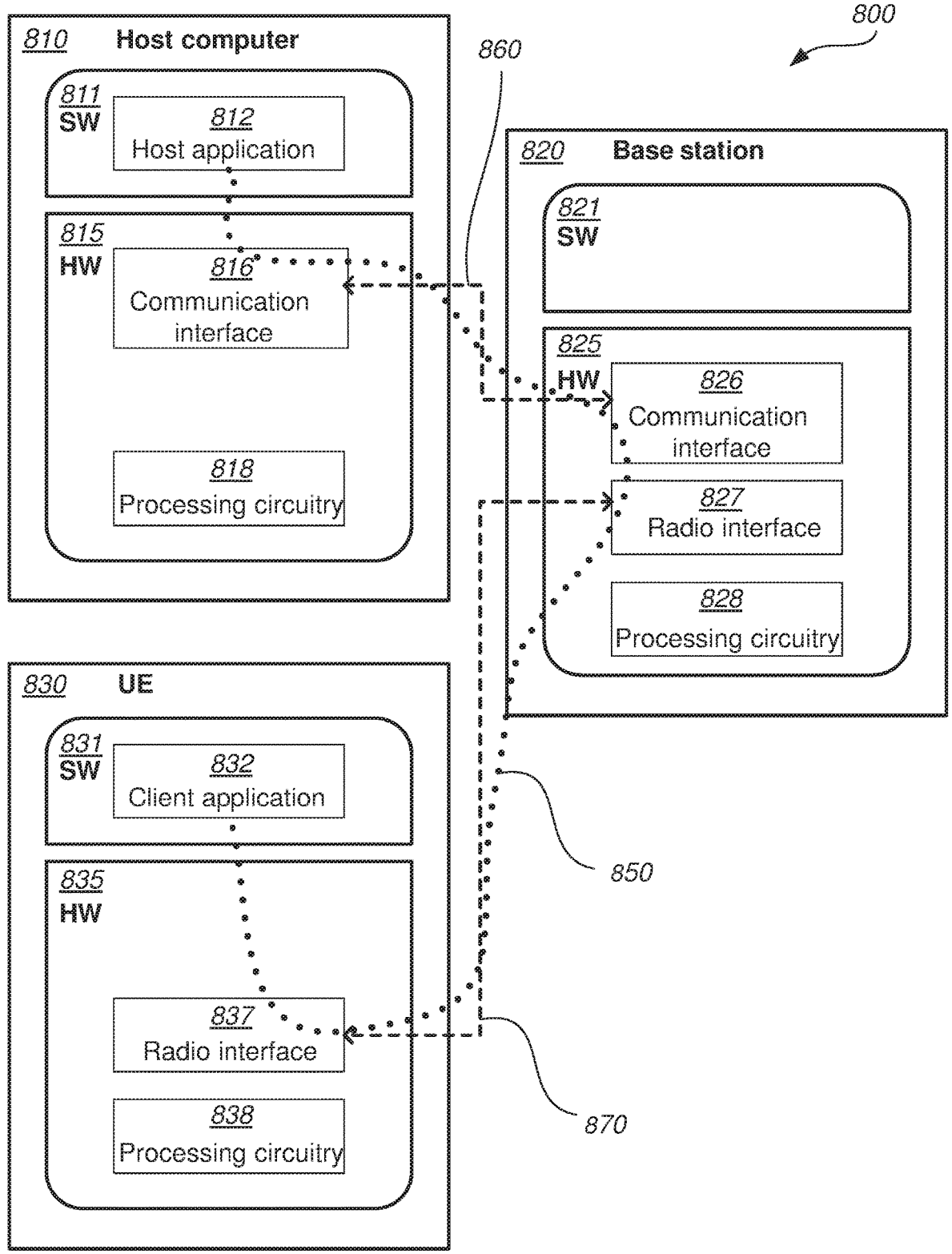
FIG. 8 is a generalized block diagram of a host computer communicating via a base station with a user equipment over a partially wireless connection, according to embodiments herein.

FIG. 8: Host Computer Communicating Via a Base Station with a User Equipment Over a Partially Wireless Connection in Accordance with Some Embodiments Example implementations, in accordance with an embodiment, of the wireless device 130, e.g., a UE, the network node 110, e.g., a base station and host computer discussed in the preceding paragraphs will now be described with reference to FIG. 8. In communication system 800, such as the wireless communications network 100, host computer 810 comprises hardware 815 including communication interface 816 configured to set up and maintain a wired or wireless connection with an interface of a different communication device of communication system 800. Host computer 810 further comprises processing circuitry 818, which may have storage and/or processing capabilities. In particular, processing circuitry 818 may comprise one or more programmable processors, application-specific integrated circuits, field programmable gate arrays or combinations of these (not shown) adapted to execute instructions. Host computer 810 further comprises software 811, which is stored in or accessible by host computer 810 and executable by processing circuitry 818. Software 811 includes host application 812. Host application 812 may be operable to provide a service to a remote user, such as UE 830 connecting via OTT connection 850 terminating at UE 830 and host computer 810. In providing the service to the remote user, host application 812 may provide user data which is transmitted using OTT connection 850.

Communication system 800 further includes the network node 110, exemplified in FIG. 8 as a base station 820 provided in a telecommunication system and comprising hardware 825 enabling it to communicate with host computer 810 and with UE 830. Hardware 825 may include communication interface 826 for setting up and maintaining a wired or wireless connection with an interface of a different communication device of communication system 800, as well as radio interface 827 for setting up and maintaining at least wireless connection 870 with the wireless device 130, exemplified in FIG. 8 as a UE 830 located in a coverage area (not shown in FIG. 8) served by base station 820. Communication interface 826 may be configured to facilitate connection 860 to host computer 810. Connection 860 may be direct or it may pass through a core network (not shown in FIG. 8) of the telecommunication system and/or through one or more intermediate networks outside the telecommunication system. In the embodiment shown, hardware 825 of base station 820 further includes processing circuitry 828, which may comprise one or more programmable processors, application-specific integrated circuits, field programmable gate arrays or combinations of these (not shown) adapted to execute instructions. Base station 820 further has software 821 stored internally or accessible via an external connection.

Communication system 800 further includes UE 830 already referred to. Its hardware 835 may include radio interface 837 configured to set up and maintain wireless connection 870 with a base station serving a coverage area in which UE 830 is currently located. Hardware 835 of UE 830 further includes processing circuitry 838, which may comprise one or more programmable processors, application-specific integrated circuits, field programmable gate arrays or combinations of these (not shown) adapted to execute instructions. UE 830 further comprises software 831, which is stored in or accessible by UE 830 and executable by processing circuitry 838. Software 831 includes client application 832. Client application 832 may be operable to provide a service to a human or non-human user via UE 830, with the support of host computer 810. In host computer 810, an executing host application 812 may communicate with the executing client application 832 via OTT connection 850 terminating at UE 830 and host computer 810. In providing the service to the user, client application 832 may receive request data from host application 812 and provide user data in response to the request data. OTT connection 850 may transfer both the request data and the user data. Client application 832 may interact with the user to generate the user data that it provides.

It is noted that host computer 810, base station 820 and UE 830 illustrated in FIG. 8 may be similar or identical to host computer 730, one of base stations 712a, 712b, 712c and one of UEs 791, 792 of FIG. 7, respectively. This is to say, the inner workings of these entities may be as shown in FIG. 8 and independently, the surrounding network topology may be that of FIG. 7.

In FIG. 8, OTT connection 850 has been drawn abstractly to illustrate the communication between host computer 810 and UE 830 via base station 820, without explicit reference to any intermediary devices and the precise routing of messages via these devices. Network infrastructure may determine the routing, which it may be configured to hide from UE 830 or from the service provider operating host computer 810, or both. While OTT connection 850 is active, the network infrastructure may further take decisions by which it dynamically changes the routing (e.g., on the basis of load balancing consideration or reconfiguration of the network).

Wireless connection 870 between UE 830 and base station 820 is in accordance with the teachings of the embodiments described throughout this disclosure. One or more of the various embodiments improve the performance of OTT services provided to UE 830 using OTT connection 850, in which wireless connection 870 forms the last segment. More precisely, the teachings of these embodiments may improve the latency, signalling overhead, and service interruption and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 850 between host computer 810 and UE 830, in response to variations in the measurement results. The measurement procedure and/or the network functionality for reconfiguring OTT connection 850 may be implemented in software 811 and hardware 815 of host computer 810 or in software 831 and hardware 835 of UE 830, or both. In embodiments, sensors (not shown) may be deployed in or in association with communication devices through which OTT connection 850 passes; the sensors may participate in the measurement procedure by supplying values of the monitored quantities exemplified above, or supplying values of other physical quantities from which software 811, 831 may compute or estimate the monitored quantities. The reconfiguring of OTT connection 850 may include message format, retransmission settings, preferred routing etc.; the reconfiguring need not affect base station 820, and it may be unknown or imperceptible to base station 820. Such procedures and functionalities may be known and practiced in the art. In certain embodiments, measurements may involve proprietary UE signalling facilitating host computer 810's measurements of throughput, propagation times, latency and the like. The measurements may be implemented in that software 811 and 831 causes messages to be transmitted, in particular empty or 'dummy' messages, using OTT connection 850 while it monitors propagation times, errors etc.

The wireless device 130 embodiments relate to FIG. 3, FIG. 5, and FIGS. 8-12.

The network node 110 embodiments relate to FIG. 4, FIG. 6, and FIGS. 8-12.

The wireless device 130 may also comprise a client application 832 or a client application unit, which may be configured to communicate user data with a host application unit in a host computer 810, e.g., via another link such as 850.

The wireless device 130 may comprise an arrangement as shown in FIG. 5 or in FIG. 8.

The network node 110 may also comprise a communication interface 826, which may be configured to communicate user data with a host application unit in a host computer 810, e.g., via another link such as 850.

The network node 110 may comprise an arrangement as shown in FIG. 6 or in FIG. 8.

FIG. 9: Methods Implemented in a Communication System Including a Host Computer, a Base Station and a User Equipment in Accordance with Some Embodiments FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

FIG. 10: Methods Implemented in a Communication System Including a Host Computer, a Base Station and a User Equipment in Accordance with Some Embodiments FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

FIG. 11: Methods Implemented in a Communication System Including a Host Computer, a Base Station and a User Equipment in Accordance with Some Embodiments FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

FIG. 12: Methods Implemented in a Communication System Including a Host Computer, a Base Station and a User Equipment in Accordance with Some Embodiments FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further Numbered Embodiments

1. A base station configured to communicate with a user equipment (UE), the base station comprising a radio interface and processing circuitry configured to perform one or more of the actions described herein as performed by the network node 110.

5. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform one or more of the actions described herein as performed by the network node 110.

6. The communication system of embodiment 5, further including the base station.

7. The communication system of embodiment 6, further including the UE, wherein the UE is configured to communicate with the base station.

8. The communication system of embodiment 7, wherein:

the processing circuitry of the host computer is configured to execute a host application, thereby providing the user data; and the UE comprises processing circuitry configured to execute a client application associated with the host application.

11. A method implemented in a base station, comprising one or more of the actions described herein as performed by the network node 110.

15. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs one or more of the actions described herein as performed by the network node 110.

16. The method of embodiment 15, further comprising:

at the base station, transmitting the user data.

17. The method of embodiment 16, wherein the user data is provided at the host computer by executing a host application, the method further comprising:

at the UE, executing a client application associated with the host application.

21. A user equipment (UE) configured to communicate with a base station, the UE comprising a radio interface and processing circuitry configured to perform one or more of the actions described herein as performed by the wireless device 130.

25. A communication system including a host computer comprising:

processing circuitry configured to provide user data; and a communication interface configured to forward user data to a cellular network for transmission to a user equipment (UE), wherein the UE comprises a radio interface and processing circuitry, the UE's processing circuitry configured to perform one or more of the actions described herein as performed by the wireless device 130.

26. The communication system of embodiment 25, further including the UE.

27. The communication system of embodiment 26, wherein the cellular network further includes a base station configured to communicate with the UE.

28. The communication system of embodiment 26 or 27, wherein:

the processing circuitry of the host computer is configured to execute a host application, thereby providing the user data; and the UE's processing circuitry is configured to execute a client application associated with the host application.

31. A method implemented in a user equipment (UE), comprising one or more of the actions described herein as performed by the wireless device 130.

35. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs one or more of the actions described herein as performed by the wireless device 130.

36. The method of embodiment 35, further comprising:

at the UE, receiving the user data from the base station.

41. A user equipment (UE) configured to communicate with a base station, the UE comprising a radio interface and processing circuitry configured to perform one or more of the actions described herein as performed by the wireless device 130.

45. A communication system including a host computer comprising:

a communication interface configured to receive user data originating from a transmission from a user equipment (UE) to a base station, wherein the UE comprises a radio interface and processing circuitry, the UE's processing circuitry configured to: perform one or more of the actions described herein as performed by the wireless device 130.

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:

the processing circuitry of the host computer is configured to execute a host application; and the UE's processing circuitry is configured to execute a client application associated with the host application, thereby providing the user data.

49. The communication system of embodiment 46 or 47, wherein:

the processing circuitry of the host computer is configured to execute a host application, thereby providing request data; and the UE's processing circuitry is configured to execute a client application associated with the host application, thereby providing the user data in response to the request data.

51. A method implemented in a user equipment (UE), comprising one or more of the actions described herein as performed by the wireless device 130.

52. The method of embodiment 51, further comprising:

providing user data; and forwarding the user data to a host computer via the transmission to the base station.

55. A method implemented in a communication system including a host computer, a base station and a user equipment (UE), the method comprising:

at the host computer, receiving user data transmitted to the base station from the UE, wherein the UE performs one or more of the actions described herein as performed by the wireless device 130.

56. The method of embodiment 55, further comprising:

at the UE, providing the user data to the base station.

57. The method of embodiment 56, further comprising:

at the UE, executing a client application, thereby providing the user data to be transmitted; and at the host computer, executing a host application associated with the client application.

58. The method of embodiment 56, further comprising:

at the UE, executing a client application; and at the UE, receiving input data to the client application, the input data being provided at the host computer by executing a host application associated with the client application, wherein the user data to be transmitted is provided by the client application in response to the input data.

61. A base station configured to communicate with a user equipment (UE), the base station comprising a radio interface and processing circuitry configured to perform one or more of the actions described herein as performed by the network node 110.

65. A communication system including a host computer comprising a communication interface configured to receive user data originating from a transmission from a user equipment (UE) to a base station, wherein the base station comprises a radio interface and processing circuitry, the base station's processing circuitry configured to perform one or more of the actions described herein as performed by the network node 110.

66. The communication system of embodiment 65, further including the base station.

67. The communication system of embodiment 66, further including the UE, wherein the UE is configured to communicate with the base station.

68. The communication system of embodiment 67, wherein:
the processing circuitry of the host computer is configured to execute a host application;
the UE is configured to execute a client application associated with the host application, thereby providing the user data to be received by the host computer.

71. A method implemented in a base station, comprising one or more of the actions described herein as performed by the network node 110.

75. A method implemented in a communication system including a host computer, a base station and a user equipment (UE), the method comprising:
at the host computer, receiving, from the base station, user data originating from a transmission which the base station has received from the UE, wherein the UE performs one or more of the actions described herein as performed by the wireless device 130.

76. The method of embodiment 75 further comprising:
at the base station, receiving the user data from the UE.

77. The method of embodiment 76, further comprising:
at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).
3GPP 3rd Generation Partnership Project
5G 5th Generation
DL Downlink
eNB E-UTRAN NodeB
E-UTRA Evolved UTRA
E-UTRAN Evolved UTRAN
GERAN GSM EDGE Radio Access Network
gNB Base station in NR
GSM Global System for Mobile communication
HSPA High Speed Packet Access
LTE Long-Term Evolution
OFDM Orthogonal Frequency Division Multiplexing
UE User Equipment
UL Uplink
UMTS Universal Mobile Telecommunication System
UTRA Universal Terrestrial Radio Access
UTRAN Universal Terrestrial Radio Access Network
WCDMA Wide CDMA
WLAN Wide Local Area Network
BSR Buffer Status Request
CC Component Carrier
CCA Clear Channel Assessment
CQI Channel Quality Information
CRC Cyclic Redundancy Check
DCI Downlink Control Information
DL Downlink
DMTC DRS Measurement Timing Configuration
DRS Discovery Reference Signal
eNB evolved NodeB, base station
UE User Equipment
UL Uplink
LAA Licensed-Assisted Access
SCell Secondary Cell
STA Station
LBT Listen-before-talk
LTE-U LTE in Unlicensed Spectrum
PDCCH Physical Downlink Control Channel
PMI Precoding Matrix Indicator
PUSCH Physical Uplink Shared Channel
RAT Radio Access Technology
RNTI Radio Network Temporary Identifier
TXOP Transmission Opportunity
UL Uplink

The invention claimed is:

1. A method, performed by a wireless device, for handling access to a cell, the wireless device operating in a wireless communications network, the method comprising:
determining, given a first uplink carrier in use during a random access procedure to the cell served by a network node operating in the wireless communications network, whether or not a second uplink carrier is to be used during the random access procedure to the cell, instead of the first uplink carrier, and
using, based on a result of the determination, one of the first uplink carrier and the second uplink carrier, to continue the random access procedure to the cell, wherein the determining is based on a condition based on at least one of a Time to Trigger and a hysteresis.

2. The method according to claim 1, wherein the cell is a New Radio, NR, cell.

3. The method according to claim 1, wherein the first uplink carrier is one of a supplementary uplink carrier and a new radio uplink carrier, and the second uplink carrier is the other of the supplementary uplink carrier and the new radio uplink carrier.

4. The method according to claim 1, wherein the method further comprises:
changing, to continue the random access procedure to the cell and based on the result of the determination, from the first uplink carrier to the second uplink carrier to access the cell, wherein the changing is performed at any time, and at least one time, during the random access procedure to the cell.

5. A method, performed by a network node, for handling access by a wireless device to a cell, the cell being served by the network node, the network node and the wireless device operating in a wireless communications network, the method comprising:
sending an indication to the wireless device indicating whether or not a change between a first uplink carrier and a second uplink carrier is allowed during the random access procedure to the cell, and
receiving, given the first uplink carrier in use during a random access procedure to the cell with the wireless device, signalling for the random access procedure to the cell using the second uplink carrier, instead of the first uplink carrier, wherein the receiving is based on the sent indication, wherein the receiving is based on at least one of a Time_to_Trigger and a hysteresis.

6. A wireless device, for handling access to a cell, the wireless device being configured to operate in a wireless communications network, the wireless device comprising:
  radio circuitry; and
  processing circuitry configured to:
    determine, given a first uplink carrier configured to be in use during a random access procedure to the cell configured to be served by a network node configured to operate in the wireless communications network, whether or not a second uplink carrier is to be used during the random access procedure to the cell, instead of the first uplink carrier, and
    use, based on a result of the determination, one of the first uplink carrier and the second uplink carrier, to continue the random access procedure to the cell, wherein the determining is based on a condition based on at least one of a Time to Trigger and a hysteresis.

7. The wireless device according to claim 6, wherein the cell is configured to be a New Radio, NR, cell.

8. The wireless device according to claim 6, wherein the first uplink carrier is configured to be one of a supplementary uplink carrier and a new radio uplink carrier, and the second uplink carrier is configured to be the other of the supplementary uplink carrier and the new radio uplink carrier.

9. The wireless device according to claim 6, wherein the processing circuitry is configured to determine, at any time, and at least one time, during the random access procedure to the cell, whether or not the second uplink carrier is to be used during the random access procedure to the cell.

10. The wireless device according to claim 6, wherein the processing circuitry is further configured to:
  change, to continue the random access procedure to the cell and based on the result of the determination, from the first uplink carrier to the second uplink carrier to access the cell, wherein to change is configured to be performed at any time, and at least one time, during the random access procedure to the cell.

11. The wireless device according to claim 6, wherein the processing circuitry is configured to determine, for every preamble transmission within the random access procedure to the cell, whether or not the second uplink carrier is to be used during the random access procedure to the cell.

12. The wireless device according to claim 6, wherein the processing circuitry is configured to determine whether or not the second uplink carrier is to be used during the random access procedure to the cell, after one of:
  a number of attempts to access the cell within the random access procedure to the cell; and
  an expiration of a timer within the random access procedure to the cell.

13. The wireless device according to claim 6, wherein the processing circuitry is configured to determine whether or not the second uplink carrier is to be used during the random access procedure to the cell, based one at least one of:
  a first load in the first uplink carrier and a second load in the second uplink carrier;
  a first strength of a downlink carrier in the cell; and
  a first quality of the first uplink carrier and a second quality in the second uplink carrier.

14. The wireless device according to claim 6, wherein the processing circuitry is configured to determine whether or not the second uplink carrier is to be used during the random access procedure to the cell, based on a speed of the wireless device.

15. The wireless device according to claim 6, the processing circuitry is further configured to:
  receive an indication from the network node indicating whether or not a change between the first uplink carrier and the second uplink carrier is allowed during the random access procedure to the cell, and wherein to determine is configured to be based on the received indication.

16. The wireless device according to claim 6, the processing circuitry being further configured to:
  switch an uplink bandwidth part configured to be used for the random access procedure to the cell, for a contention based random access, based on at least one of:
    a number of attempts to access the cell within the random access procedure to the cell;
    an expiration of a timer within the random access procedure to the cell;
    a first load in the first uplink carrier and a second load in the second uplink carrier;
    a first strength of the first uplink carrier and a second strength in the second uplink carrier; and
    a first quality of the first uplink carrier and a second quality in the second uplink carrier.

17. A network node, for handling access by a wireless device to a cell, the cell being configured to be served by the network node, the network and the wireless device being further configured to operate in a wireless communications network, the network node comprising:
  radio circuitry; and
  processing circuitry configured to:
    send an indication to the wireless device indicating whether or not a change between a first uplink carrier and a second uplink carrier is allowed during the random access procedure to the cell, and
    receive, given the first uplink carrier configured to be in use during a random access procedure to the cell with the wireless device, signalling for the random access procedure to the cell using the second uplink carrier, instead of the first uplink carrier, wherein the receiving is configured to be based on the sent indication, wherein the receiving is based on at least one of a Time_to_Trigger and a hysteresis.

18. The network node according to claim 17, wherein the cell is configured to be a New Radio, NR, cell.

19. The network node according to claim 17, wherein the first uplink carrier is configured to be one of a supplementary uplink carrier and a new radio uplink carrier, and the second uplink carrier is configured to be the other of the supplementary uplink carrier and the new radio uplink carrier.

20. The network node according to claim 17, wherein the processing circuitry is configured to receive the signaling at any time, and at least one time, during the random access procedure to the cell.

21. The network node according to claim 17, wherein the processing circuitry is configured to receive the signaling after one or more preamble transmissions within the random access procedure to the cell.

22. The network node according to claim 17, wherein the processing circuitry is configured to receive the signaling after one of:
  a number of attempts to access the cell within the random access procedure to the cell; and
  an expiration of a timer within the random access procedure to the cell.

23. The network node according to claim 17, wherein the processing circuitry is configured to receive the signaling based one at least one of:
- a first load in the first uplink carrier and a second load in the second uplink carrier;
- a first strength of a downlink carrier in the cell; and
- a first quality of the first uplink carrier and a second quality in the second uplink carrier.

24. The network node according to claim 17, wherein the processing circuitry is configured to receive the signaling based on a speed of the wireless device.

* * * * *